(12) United States Patent
Hashiguchi et al.

(10) Patent No.: US 7,468,821 B2
(45) Date of Patent: Dec. 23, 2008

(54) IMAGE DETERMINATION APPARATUS AND IMAGE DETERMINATION METHOD

(75) Inventors: Sumihisa Hashiguchi, Kofu (JP); Keitarou Kawai, Hamamatsu (JP); Norimasa Hikosaka, Toyohashi (JP); Atsuko Morita, Takasaki (JP); Mineo Kubota, Kofu (JP); Mitsuo Tsuchiya, Yamanashi-ken (JP)

(73) Assignee: NISCA Corporation, Minamikoma-Gun, Yamanashi-Ken (JP)

( * ) Notice: Subject to any disclaimer, the term of this patent is extended or adjusted under 35 U.S.C. 154(b) by 1632 days.

(21) Appl. No.: 10/218,598

(22) Filed: Aug. 15, 2002

(65) Prior Publication Data

US 2003/0072044 A1    Apr. 17, 2003

(30) Foreign Application Priority Data

Aug. 31, 2001   (JP) ............................. 2001-310735
Feb. 19, 2002   (JP) ............................. 2002-089928

(51) Int. Cl.
G03F 3/08    (2006.01)
G06F 15/00   (2006.01)
G06K 9/00    (2006.01)

(52) U.S. Cl. .................. 358/520; 358/1.9; 382/167
(58) Field of Classification Search ............... 358/520, 358/518, 504, 538, 540, 537, 1.9, 1.1; 382/167, 382/162

See application file for complete search history.

(56) References Cited

U.S. PATENT DOCUMENTS 5,867,169 A * 2/1999 Prater ..................... 345/604
5,883,973 A * 3/1999 Pascovici et al. ............ 382/176
6,151,410 A * 11/2000 Kuwata et al. .............. 382/167
2007/0201763 A1* 8/2007 Kuwata et al. .............. 382/276

FOREIGN PATENT DOCUMENTS

| JP | 7-143281 | 6/1995 |
| JP | 8-139949 | 5/1996 |
| JP | H08-139949 | 5/1996 |
| JP | 8-163316 | 6/1996 |
| JP | H11-196282 | 7/1999 |
| JP | 2001-036752 | 2/2001 |

* cited by examiner

*Primary Examiner*—Madeleine A Nguyen
(74) *Attorney, Agent, or Firm*—Manabu Kanesaka

(57) ABSTRACT

An image determination apparatus, an image reading apparatus, and an image determining method include a device for cutting a color/monochrome region based on a color saturation value obtained by a predetermined derivation method based on image data, and a device for detecting image errors located in large boundaries of brightness variations including color distortions based on correlations between color saturation and color. When errors are included in the image data acquired by, for example, a color image scanner due to primary color errors at random locations (in particular, color bleeding that occurs as a color distortion in monochrome achromatic color areas), it is possible to extract characteristics from the image data and detect locations in images where color distortions and color bleeding occur without using especially complicated and special compositions to detect where these errors occurred.

2 Claims, 22 Drawing Sheets

Fig. 9

|  | a* value | b* value |
| --- | --- | --- |
| Longitudinal histogram | −15<a*<25 | −5<b*<25 |
| Transverse histogram | −5<a*<20 | 0<b*<20 |
| Determine reading errors | −20<b*<30 | −20<a*<30 |

Fig. 10
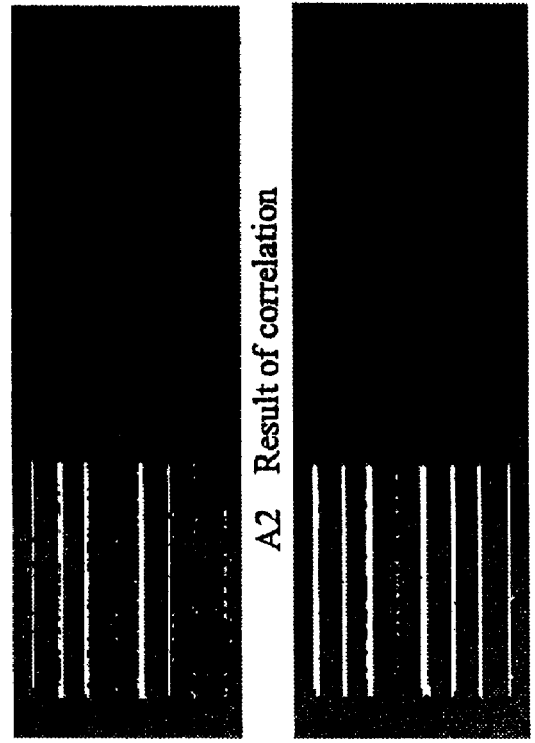
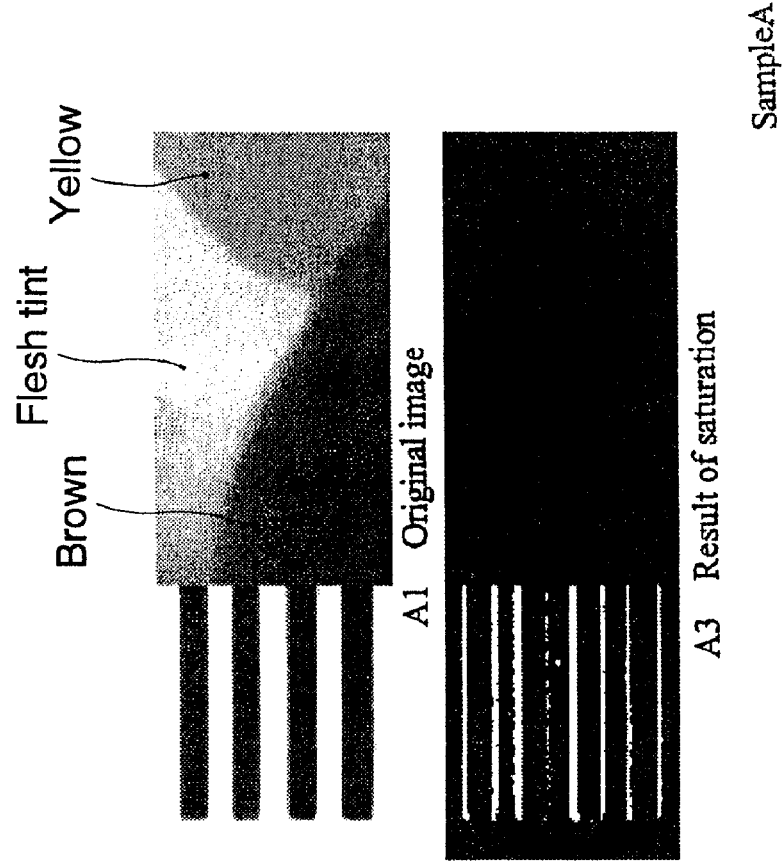

Method based on color saturation calculation in RGB.

Flowchart of method using correlation

Compositional example of detection assembly

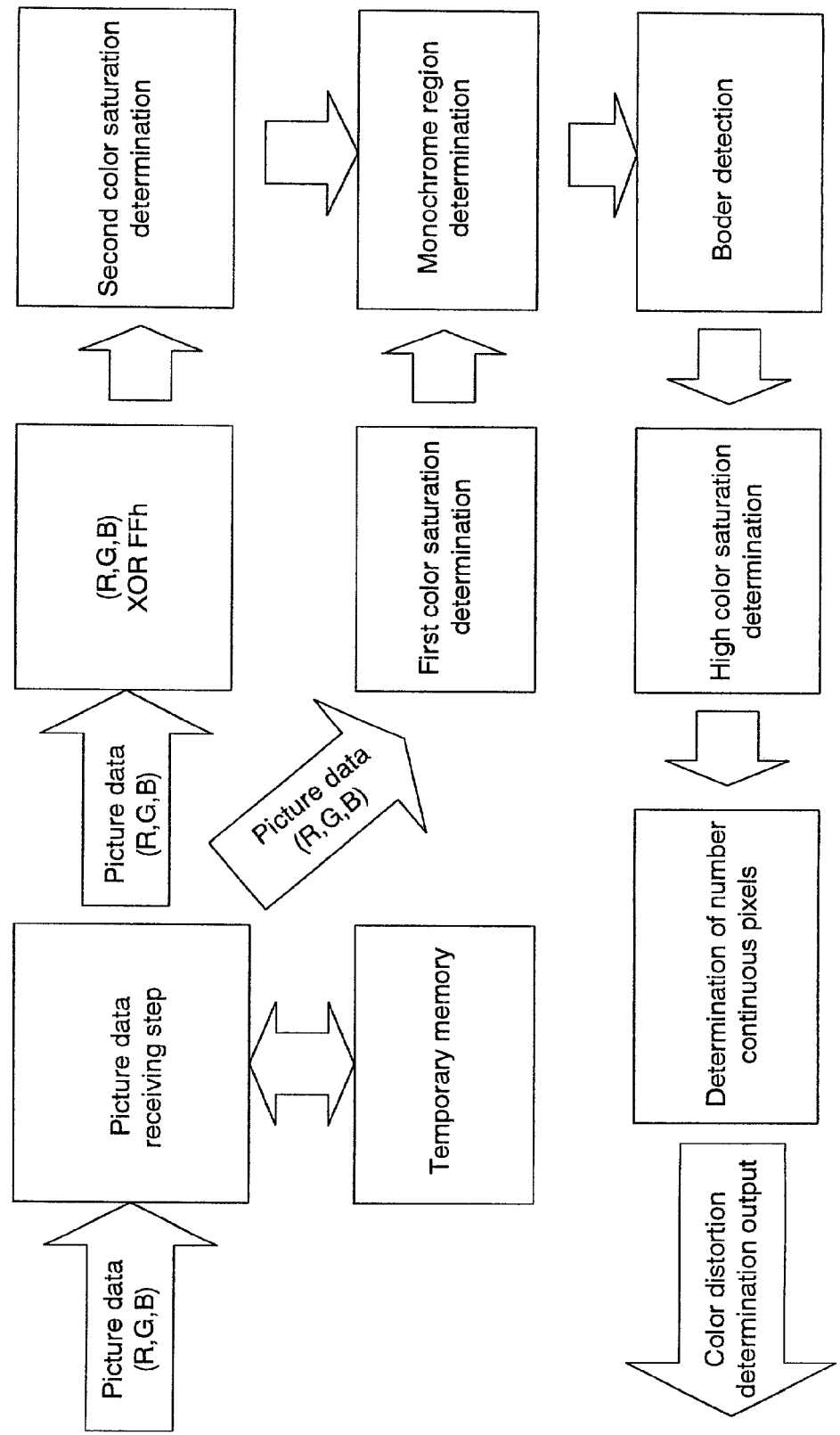
Fig. 22 Outline of the composition of an image determination apparatus that uses color saturation

IMAGE DETERMINATION APPARATUS AND IMAGE DETERMINATION METHOD

BACKGROUND OF THE INVENTION AND RELATED ART STATEMENT

The present invention relates to technology of apparatuses and methods which detect color bleeding and color distortions occurring adjacent to monochrome areas of pictures read while a transfer speed of a document is fluctuating, and relates to an image reading apparatus that reads documents while moving relative to the document and reading means, particularly the present invention comprises an image sensor that has, for example, a primary color sensor line and an image reading apparatus that simultaneously reads documents in three colors to acquire image data.

As a single-package image sensor, there are so-called three-line color sensors that have three lines of sensors which are equipped with a primary color filter in the photoelectric transducers of each line. Not only can this three-line color sensor comprise an image reading apparatus (hereinafter referred to as color scanner) that reads color and be compact in size compared to using three one-line only image sensors, but also the manufacturing processing of the manufacturer is adjusted in order that the gaps between the three lines are within the design requirements. Consequently, position adjustments for users are simplified. Another advantage is the fact that it can read color documents at high speeds while sequentially lighting a primary color light source compared to the so-called light source switching method.

There are two representative types of color scanners which use this type of three-line color sensor. One of these is called a fixed document type color scanner that reads documents secured onto a glass surface while moving an optical read system, and the other one is called a sheet pass type color scanner that has a fixed optical read system and reads documents by conveying the document being conveyed by conveyance means.

Sheet pass type color scanners which feed one sheet at a time from a stack of documents and then read the documents as they move through the scanner lack stability and have fluctuations in the images due to ripples and fluttering in the conveyance process of the documents or shocks caused by documents separating from the retaining point (nip point) of the transfer roller used to convey documents. In addition, shapes containing false errors in the original picture also occur as image data.

A sheet pass type includes a sheet pass color scanner that integrates the conveyance unit into the apparatus as well as a type of scanner in which a document feeding apparatus that separates and feeds documents from a document stack one at a time (hereinafter referred to as ADF: automatic document feeder) is installed in the above-mentioned fixed document type color scanner. In order to respond to recent demands from users who want to read double-sided documents, a composition has also emerged that holds the image reading unit within the ADF and reads both sides of the document on the color scanner and the ADF.

A fixed document type color scanner that fixes and reads documents does not exhibit unstable behavior in documents and is assumed to be able to provide stable document reads. Even with fixed document types, in a color scanner with a high-resolution read, vibrations and oscillations exist in the sub-scanning direction (direction of movement) or shuddering traversing the reading direction of the optical carriage that integrates a mirror carriage and optical system to form read lines, appear in the image just like when there are ripples in a document.

When abnormal images, which are false pictures, are contained in original pictures at random locations within an image acquired in this manner (in particular, color distortions and color bleeding occurring at monochrome achromatic color areas), it is difficult to detect where these images exist, thereby increasing the desire for a definitive solution. Thereupon, an object of the present invention is to take these problems into consideration and provide an apparatus and a method that can extract characteristics from already acquired image data and detect the locations in the images where color distortions and color bleeding occur without using an especially complicated or special configuration.

The read position differs on the surface of a document in a so-called three-line simultaneous read system that uses a three-line color sensor in which photoelectric transducers within one package are arranged in three primary color lines to read documents. Because of this, when the document is not conveyed evenly, the read position on the image data will become inconsistent with the intervals in the composition of the image sensor, resulting in the occurrence of blurring in the image. The position of the read lines which read the three primary colors of the document surface can be made to coincide in order to avoid this. Japanese Patent Publication (Tokkai) No. 07-143281 (prior art-1) is an example from this point of view. In this example, a dispersion element such as a prism is placed in the optical path in an optical reduction system. This method, however, requires the dispersion position to coincide with the positions of each color line of the image sensor, thereby requiring very precise adjustments which in turn leads to considerable manufacturing processes and in particular makes the adjustment process complicated making this an undesirable method.

Japanese Patent Publication (Tokkai) No. 08-163316 (prior art-2) teaches a device wherein a document is read and the image data analyzed with black regions being detected from each color data. This is performed together with the brightness varying to a large degree, namely, the focal point targeting high contrast areas (edge regions between white and black), a determination being made as to whether or not the locations of each of the three primary colors coincide at this location and the color distortion portion being detected and corrected. In this disclosure, however, only the utilization of brightness for the method to detect black locations was disclosed while a detection method with good achromatic color accuracy is not.

Furthermore, Japanese Patent Publication (Tokkai) No. 08-139949 (prior art-3) teaches technology wherein a correlation function is used as a detection method of color saturation regions. This document also disclosed that when peak values and the total value of the correlation function are observed, it is possible to distinguish between chromatic color regions due to position read errors or fundamental low-frequency chromatic color regions (color areas) and improve the performance of read error separation from similarly shaped original images because of equivalence due to auto-correlation, for example, read errors accompanying simple shapes such as thin lines. The fact that auto-correlation determination must be introduced results in a composition that governs calculations.

The first object of the present invention is to build a color saturation means that identifies color saturation regions based on calculations which use both original image data values and negative image data values in order to obtain color saturation detection without using cross-correlation that requires an execution time. The first object of the present invention is also to provide an image determination apparatus equipped with a color bleed determination means that detects whether color bleeds are present at locations the color saturation means has identified as monochrome regions and an image reading apparatus and image determination method equipped with this image determination apparatus.

The second object of the present invention is to build a color saturation means that identifies color saturation regions from the magnitude of cumulative values after L*a*b* conversion of the three primary colors R, G and B using table conversion in order to obtain color saturation detection without using cross-correlation that requires an execution time. The second object of the present invention is also to provide an image determination apparatus equipped with a color bleed determination means that detects whether color bleeds are present at locations the color saturation means has identified as monochrome regions and an image reading apparatus and image determination method equipped with this image determination apparatus.

The third object of the present invention is to divide examined regions based on the magnitude of deviation values along with introducing distributed arithmetic for the purpose of standard deviation calculations when calculating correlations to determine whether high color saturation color bleeding is present after obtaining a division of the color/monochrome regions. The third object of the present invention is also to provide an image determination apparatus comprising a simplified error detection means and an image reading apparatus and image determination method equipped with this image determination apparatus.

SUMMARY OF THE INVENTION

In order to achieve the above-mentioned objects, as the first aspect the present invention provides an image determination apparatus characterized by comprising an image data receiving means that receives image data comprising picture elements (pixels) formed from RGB (three primary colors of light), a first comparing means that compares a first color saturation value determined from color components of each pixel of the above-mentioned received image data to a first threshold value, a reversed image calculation means that calculates the color components of reversed images, or negative images, acquired by subtracting the above-mentioned color components from the maximum value of the color components of each of the above-mentioned pixels that can be obtained, a second comparing means that compares a second color saturation value determined from color components of this reversed image to a threshold value, and a color region determination means that determines whether there is color or monochrome based on the result of the comparison between the first comparing means and the second comparing means. Consequently, the present invention achieves region separation in order to simplify uneven divisions of color saturation values and obtain a simple processing circuit and achieve a region determination using programs as well as to quickly and easily detect high color saturation locations existing close to monochrome areas (none or low color regions) of color images.

In addition to the above-mentioned image determination apparatus, the present invention provides a brightness change detection means that finds color saturation values based on maximum values and minimum values in the color components of the above-mentioned pixels and then examines any changes in brightness from values of the color components of the pixels for regions the above-mentioned color region determination means has determined to be monochrome, an edge detection means that detects excessive change points in brightness obtained by comparing the detected value from the brightness change detection means and a specified value, a color saturation recalculation means that recalculates color saturation values at excessive change points in brightness detected by the edge detection means, and an error detection means that compares the result of the above-mentioned color saturation recalculation means to a specified value to determine errors in image data by counting the number of consecutive pixels which exceed a specified value. Consequently, the present invention achieves quick and easy detection of high color saturation locations existing close to monochrome areas (none or low color regions) of color images.

The second aspect of the present invention can also be an image determination apparatus characterized by comprising an image data receiving means that receives image data comprising picture elements (pixels) formed from RGB (three primary colors of light), a color conversion means that converts RGB color space of image data received by the image data receiving means to a uniform perceived color space that comprises brightness values in proportion to luminous intensity and standardized perceived color values in proportion to human coloring, an accumulation means that accumulates perceived color values of image data converted by the color conversion means in each small region comprised by specified pixels, and a color region determination means that determines whether the small regions are color or monochrome based on the accumulated value. Consequently, the present invention achieves region separation in order to simplify uneven divisions of color saturation values and obtain a simple processing circuit and achieve a region determination using programs as well as to quickly and easily detect high color saturation locations existing close to none or low color regions of color images.

In addition to the above-mentioned image determination apparatus, the image determination apparatus can be characterized by an error determination means wherein the above-mentioned color conversion means performs conversions to CIE 1976 standard L*a*b* uniform perceived color space as well as determines whether the small regions are color or monochrome based on the accumulated value of the a* value and/or the b* value of the image data converted to the uniform perceived color space within the small regions and determines errors in image data based on the accumulation of perceived color values in regions even smaller than the above-mentioned regions including target pixels within small monochrome regions and in addition, the above-mentioned error determination means determines if an error exists when the cumulative value of the a* value or the cumulative value of the b* value of the target pixels are outside the range of a specified value. Consequently, the present invention achieves quick and easy detection of high color saturation locations existing close to monochrome (none or low color regions) of color images.

The third aspect of the present invention is an image determination apparatus that can be characterized by an image determination apparatus equipped with a color discrimination means that receives image data comprising picture elements (pixels) formed from RGB (three primary colors of light) and determines whether the target pixels of the discrimination in the regions of the above-mentioned image data which are divided up into small regions are color or monochrome. Further, this color discrimination means comprises an error determination means that determines whether there is color or monochrome in the above-mentioned small regions determined to be monochrome based on values of three types of standard deviations which use two reciprocal primary colors of three color components using the pixels of the small regions and also determines if errors exist in image data based on three types of correlated values which use two reciprocal primary colors of three color components of the discrimination target pixels. Even further, the color distortion detection means calculates the correlated values as candidates for error determination when the values of the above-mentioned standard deviations exceed a specified value. Consequently, the present invention achieves quick and easy detection of high color saturation locations existing close to monochrome areas (none or low color regions) of color images.

The fourth aspect of the present invention can provide an image reading apparatus that can detect and forcibly correct for errors even if there is an occurrence of a high color saturation border (color distortion) in a monochrome area by comprising an image reading apparatus equipped with these image determination apparatuses.

The fifth aspect of the present invention can be an image determination method characterized by a receiving process that receives image data accepting image data that receives image data comprising picture pixels formed from RGB which are the three primary colors of light, a first comparison process that compares a first color saturation value determined from color components of each pixel of the above-mentioned received image data to a first threshold value, a reversed image calculation means that calculates the color components of reversed images acquired by subtracting the above-mentioned color components from the maximum value of the color components of each of the above-mentioned pixels that can be obtained, a second comparing means that compares a second color saturation value determined from color components of this reversed image to a threshold value, and a color region determination means that determines whether there is color or monochrome based on the result of the comparison between the first comparing means and the second comparing means. Consequently, the present invention achieves region separation in order to simplify uneven divisions of color saturation values and obtain a simple processing circuit and achieve a region determination using programs as well as to quickly and easily detect high color saturation locations existing close to monochrome areas (none or low color regions) of color images.

The sixth aspect of the present invention can be an image determination method characterized by comprising an image data receiving process that receives image data comprising picture elements (pixels) formed from RGB (three primary colors of light), a color conversion process that converts RGB color space of this received image data to a uniform perceived color space that comprises brightness values in proportion to luminous intensity and standardized perceived color values in proportion to human coloring, an accumulation process that accumulates perceived color values of image data converted by the color conversion process in each small region comprised by specified pixels, and a color region determination process that determines whether the small regions are color or monochrome based on the accumulation result of the accumulation process. Consequently, the present invention achieves region separation in order to simplify uneven divisions of color saturation values and obtain a simple processing circuit and achieve a region determination using programs as well as to quickly and easily detect high color saturation locations existing close to monochrome areas (none or low color regions) of color images.

Furthermore, the seventh aspect of the present invention can be an error determination method characterized by comprising a determination process that determines whether there is color or monochrome in the regions determined to be monochrome by the above-mentioned color region determination means based on values of three types of standard deviations which use two reciprocal primary colors of three color components using the pixels of the small regions of a specified number of pixels, and an error determination process that determines if errors exist in image data based on three types of correlated values which use two reciprocal primary colors of three color components of the discrimination target pixels. Consequently, the present invention achieves quick and easy detection of high color saturation locations existing close to monochrome areas (none or low color regions) of color images.

BRIEF DESCRIPTION OF THE DRAWINGS

FIG. 9 shows a collection of threshold values used in a color/monochrome separation using the CIE L*a*b* method;

FIG. 10 shows an original image in A1, results of correlation in A2, results of color saturation in A3 and results of the CIE L*a*b* method in A4;

FIG. 22 shows an outline of a composition of an image determination apparatus that uses color saturation.

DETAILED DESCRIPTION OF PREFERRED EMBODIMENTS

Figure 1:
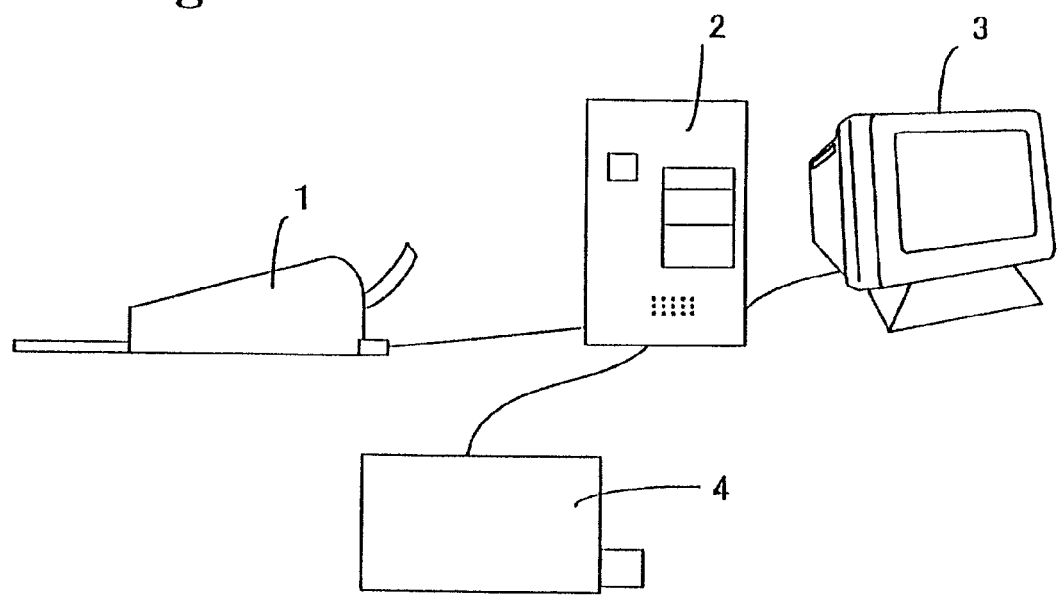
FIG. 1 shows an example when using color distortion detection within the computer 2 or the color scanner 1.

Examples of embodiments of an image reading apparatus and an image reading method related to the present invention will be described while referring to the drawings. In addition, an embodiment of an image reading apparatus with color distortion detection that can be applied to the present invention will also be described while referring to the drawings.

Figure 17:
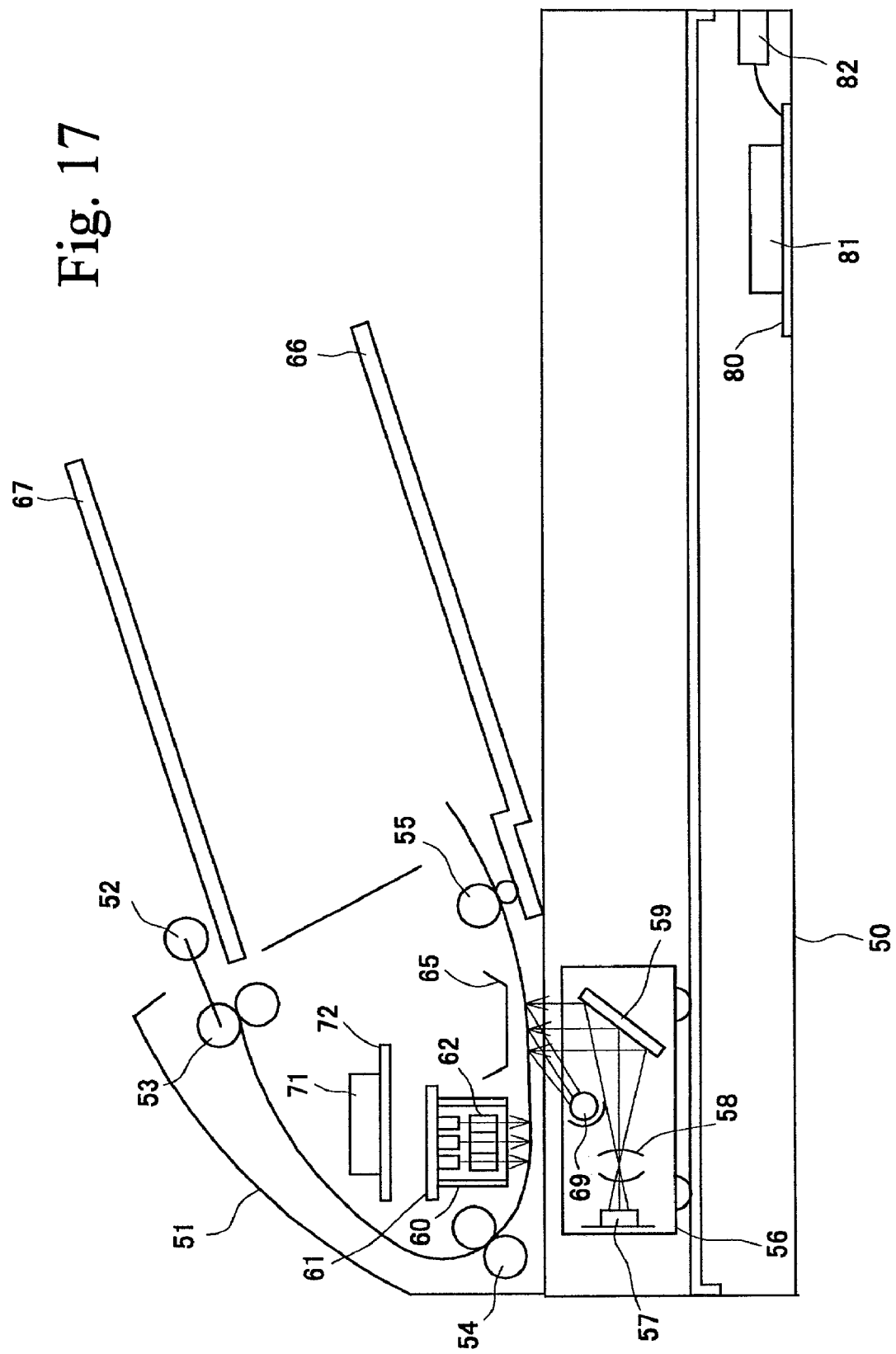
FIG. 17 shows a color scanner that includes an ADF that is the fourth aspect.

As an example, an image sensor, such as a CCD or CMOS, that has a three-line three primary color photoelectric transducer within one package is used in the image reading apparatus (flat scanner) as shown in FIG. 17.

Figure 3:
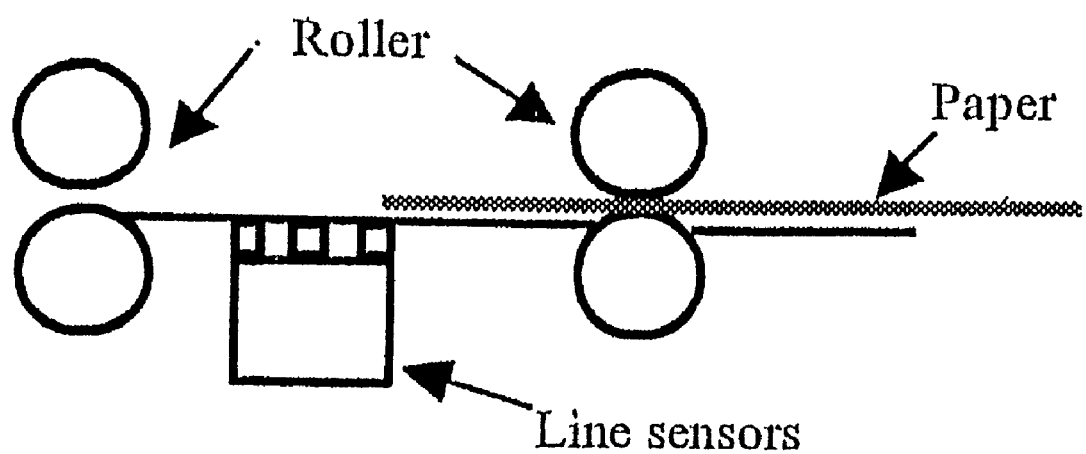
FIG. 3 shows a state of a transfer roller that generates color distortions.
Figure 4:
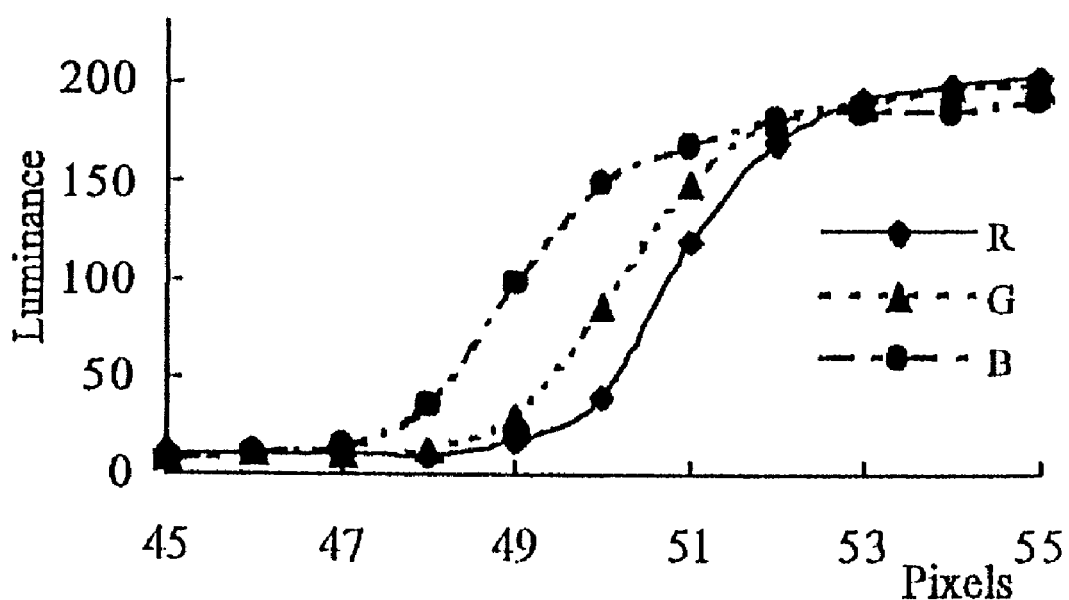
FIG. 4 shows RGB primary color values when color distortions occur.

In the color scanner of FIG. 17, an ADF (automatic document feeder) is installed to make this a sheet pass color scanner that feeds and conveys documents one sheet at a time and then reads them as they pass through the scanner. There is a lack of stability and fluctuations occur while a document is being conveyed in this manner due to ripples, oscillations and fluttering or shocks caused by documents separating from the retaining point of the transfer roller used for document conveyance or collisions with the members comprising the conveyance path. (Refer to FIG. 3.)

The fixed document type color scanner in which a carriage 56, built into the color scanner of FIG. 17, moves and reads a fixed document is not considered to exhibit unstable behavior in documents and is assumed to be able to provide stable document reads. In a color scanner with a high-resolution read of, for example, 600 DPI, even a fixed document type, vibrations and oscillations in the sub-scanning direction (direction of scanning) or shuddering in the crosswise reading direction of the optical carriage that integrates a mirror carriage that forms read lines, and an optical system appear in the image just like when ripples in a document exist.

This color scanner can scan the surface of a document once and acquire three color components one time. It also reads the color of the light source while switching through three colors. This scanner is also called a sequential surface color scanner. It has a line sensor without a one-line filter and sequentially acquires three surfaces while changing filters.

There are many examples of acquiring images with this type of color scanner depending on the means to acquire the images. For example, the positioning of the read movement might be incorrect due to external impacts even in a sequential surface color scanner. This is referred to as a color distortion (color distortions are included in image data).

In this manner, detecting where the position of color distortion exists from image data that includes color distortion is difficult. The reason why is because the document more than likely contains color thereby making it difficult to classify whether there is color distortion or the original color.

If, however, color distortion occurs in the border of an achromatic color region (monochrome) existing within image data, it will be very noticeable and probably can be dealt with by resolving the error. Thereupon, if color is found in the area where the contrast is changing in an achromatic color region, properties will be used which can be obtained by means of distinguishing whether there is an original color image or color due to color distortion.

A method will be described that detects color distortion by calculating pixel coloring and negative pixel coloring and then specifying a region as a fifth embodiment that corresponds as a method in the embodiment of a first determination apparatus. An outline of the method that uses this color value is as follows.

Color distortions are noticeable when at least one color of a brightness value within RGB differs greatly from two other colors of a brightness value. Since the noticeable area is monochrome, the monochrome area is the target. The color distortion occurs in the direction of the paper feed and the influence of one error spreads to a number of pixels.

In other words, a large amount of color saturation occurs in border regions where the contrast within the monochrome regions changes greatly for pixels visible as color distortions when viewed by the human eye. Further, the determination of whether there is an original color image or a large amount of color saturation due to color distortions compares values decided on in advance and then performs the determination for which pixels continuously have a large amount of color saturation. Consequently, areas where the magnitude of the color saturation of the number of pixels is high will be detected.

Although there is a process for detecting color distortions, color saturation S and SR defined in the equation will be used.

$$S = \frac{\max(R, G, B) - \min(R, G, B)}{\max(R, G, B)} \tag{1-1}$$

$$S_R = \frac{\max(R, G, B) - \min(R, G, B)}{255 - \min(R, G, B)} \tag{1-2}$$

The following relationship is formed from equations (1-1) and (1-2).

$$S = \frac{S_R}{1 - S_R}\left(\frac{1}{V} - 1\right) \tag{1-3}$$

Here, the brightness is as follows.

$$V = \max(R, G, B)/255 \tag{1-4}$$

The variables S, SR and V above are defined in Image Analysis Handbook, Mikio Takagi & Yohisa Shimoda, p.475-491, 1991, 1, 17 (the Tokyo University Publishing).

Figure 5:
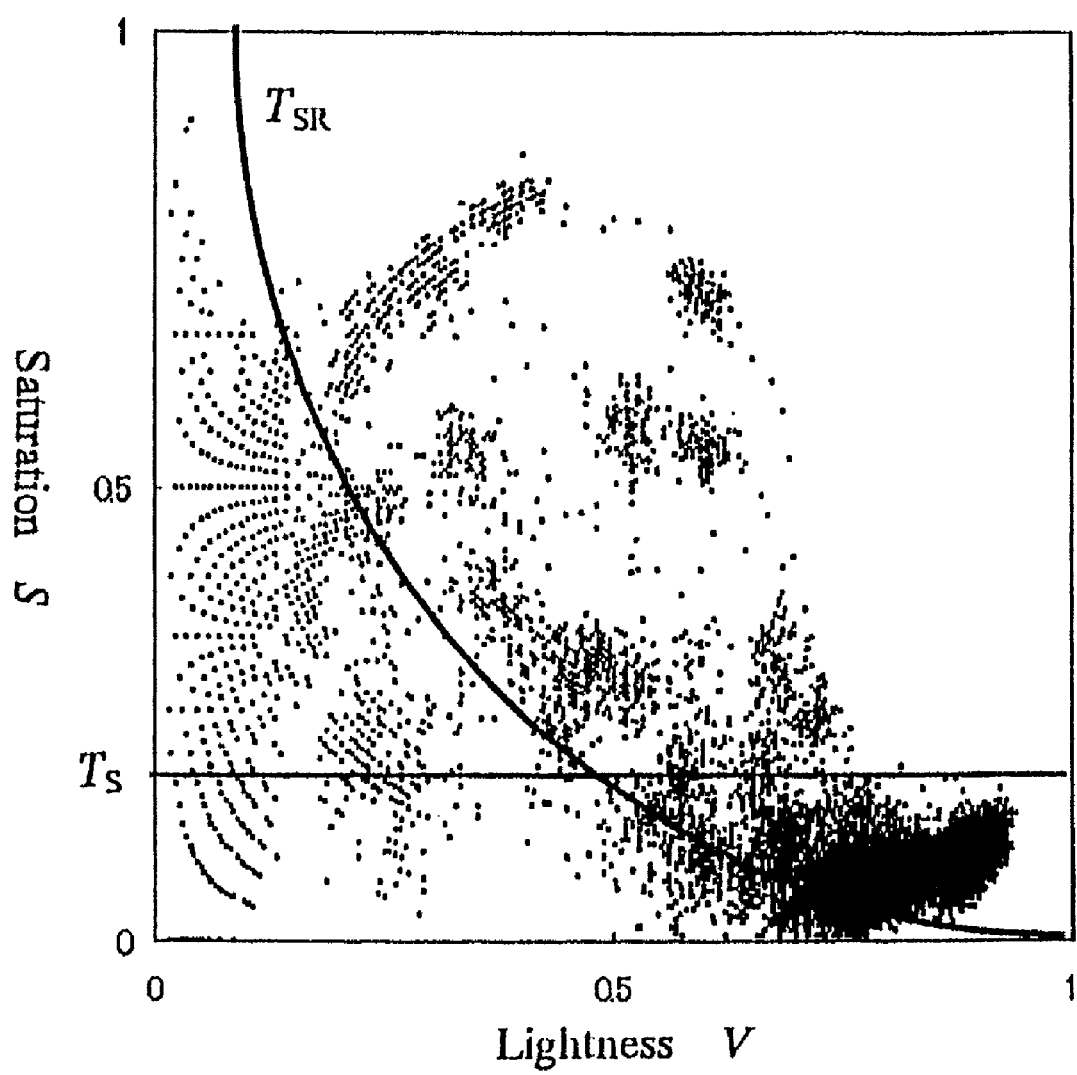
FIG. 5 shows locations where brightness due to color saturation and threshold values for determination are added in a brightness plot.

FIG. 5 is a distribution map. In the figure the X-axis is brightness V determined by equation (1-4) above and the Y-axis is color saturation S determined by equation (1-1) above. The values each pixel possesses are plotted in the figure. When threshold value TSR is stipulated for SR, that TSR will become the curve as shown in FIG. 5.

Color distortion detection is performed as follows. This process is equivalent to utilizing the remainder after removing the threshold value TS (or less) or the left side of the threshold value TSR (or less).

Figure 11:
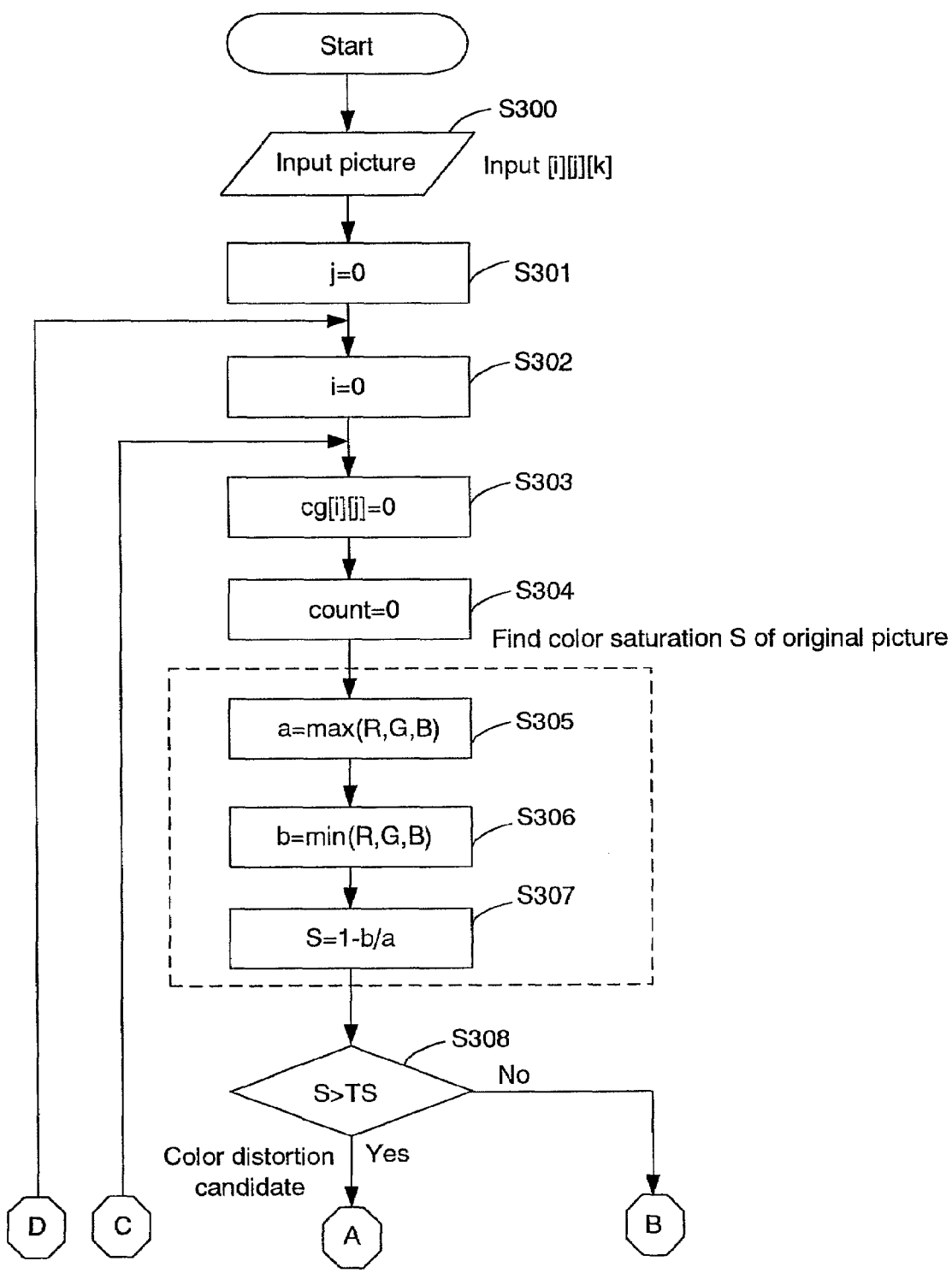
FIG. 11 shows the first half of a flow of color saturation.
Figure 12:
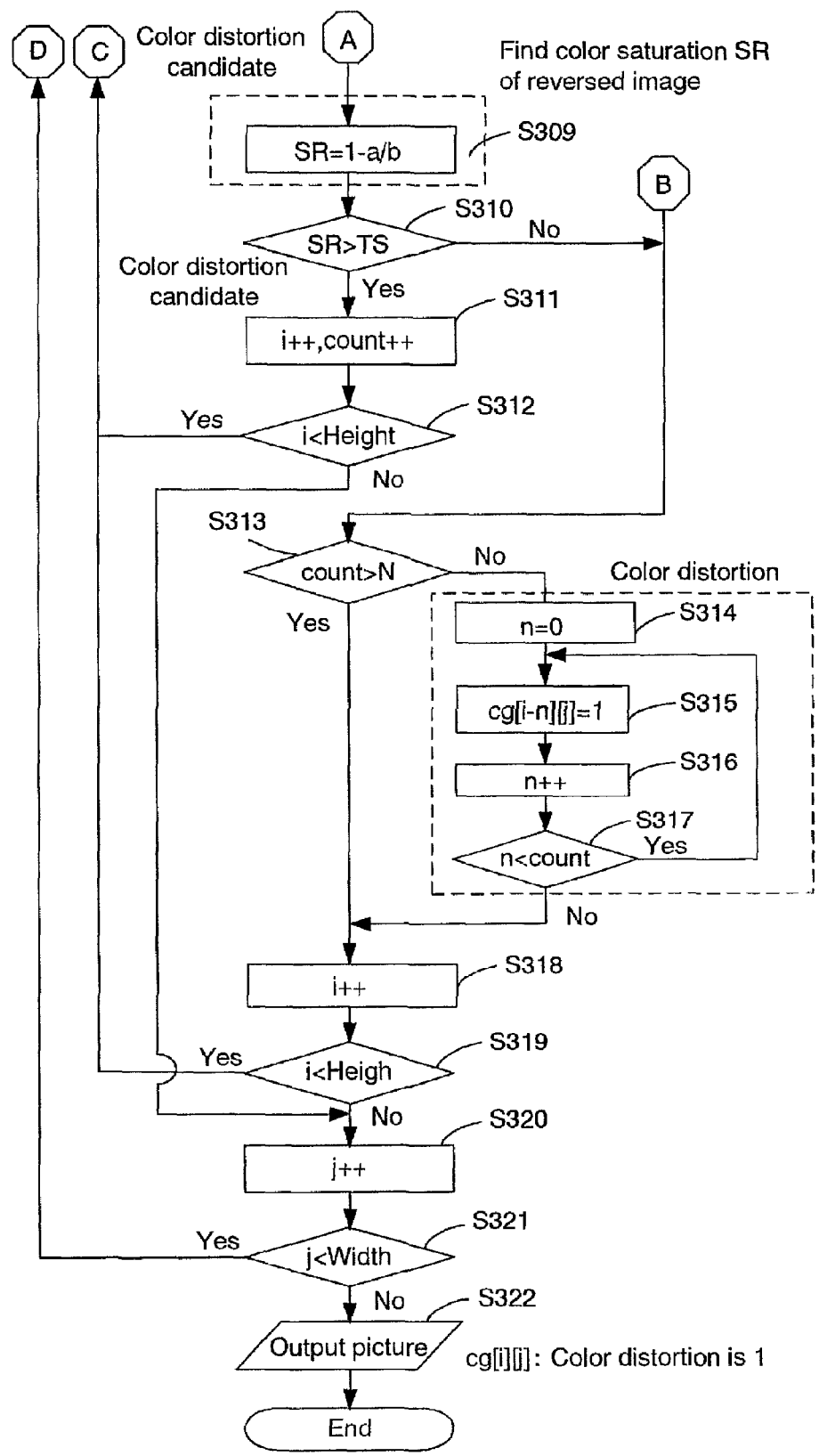
FIG. 12 shows the second half of the flow of color saturation.

(1) Find color saturation S of each pixel.
(2) Color distortion candidate when S is threshold value TS or more.
(3) Find reversed image SR.
(4) Color distortion candidate when SR is threshold value TSr or more.
(5) From the extracted candidates count the number of pixels of the candidates with sequential pixels extracted as color areas in the direction of travel of the paper and when that number is equal to or less than N pixels, detect the result as a color distortion. This is described using FIG. 11 and FIG. 12. When the sequential number is large, there is no color distortion and there is a color region. This large suitability assumes that the amount of color distortion of the images which include color distortion will be determined in advance.

A description of a color scanner that includes a rear ADF will be described referring to FIG. 19 for image acquisition input to S300. This is a step that receives image data read and saved by a color scanner. The number of pixels in the horizontal direction j and the number of pixels in the vertical direction i as well as the number of primary colors k are provided at the same time. The purpose of this is to copy and detect images read and saved by the color scanner onto an offline computer or similar device. No data in particular is provided in online processes or processes internal to an apparatus referred to as stand-alone and variables exist which allow internal transfers.

S301 and S302 are process loops formed by S312 and S318~S321. The process initializes variables in S303 and S304 and finds color saturation S of the original enlarged image in S305~S307. By comparing this result to the threshold value TS in S308, a determination is made on whether it is a candidate for a color distortion. If the threshold value is exceeded, it is a candidate. If it is not a candidate, the loop will repeat until completing all image data.

Next, the process moves to reversed image determination. Color saturation SR of a reversed image is calculated in S309 using the items which were determined to be candidates above. Then, in S310, candidates for color distortions are decided on when the calculated color saturation value of the reversed image value exceeds the threshold value TS. Thereafter, the variable count increments in S311 as a candidate determination process. When the color saturation drops and B is removed after this candidate process is repeated as a loop, a determination is made as to whether a color distortion was detected from S314 to S317 and then moves to S313. When the result is larger than specified value N, a determination will be made that there is a color region and there is no color distortion. When all the pixels have completed the processing, the process will quit in S322. At this time flag processing is performed in S315. Using this flag after the processing allows correction processing to be performed.

FIG. 22 shows an outline of the composition of an image determination apparatus that is dependent on color saturation utilizing this reversed image data. The individual circuit compositions can be comprised of commonly known technology. In addition, although determinations are made using specified threshold values for areas where determinations are performed for the entire area, each threshold values must be adjusted to an optimum value in response to the target images or the degree of color distortion contained in the image. Consequently, although this is omitted in FIG. 22, these specified values can normally be stored in non-volatile memory as parameters and if necessary, determined based on a variety of measurement values within the manufacturing process.

An example using the CIE L*a*b* method will be described as the sixth embodiment as a method that corresponds to an embodiment of a second determination apparatus.

In this method color distortion is noticeable in monochrome areas of images. The color distortion is also noticeable in high contrast areas (edge areas) in images.

Figure 6:
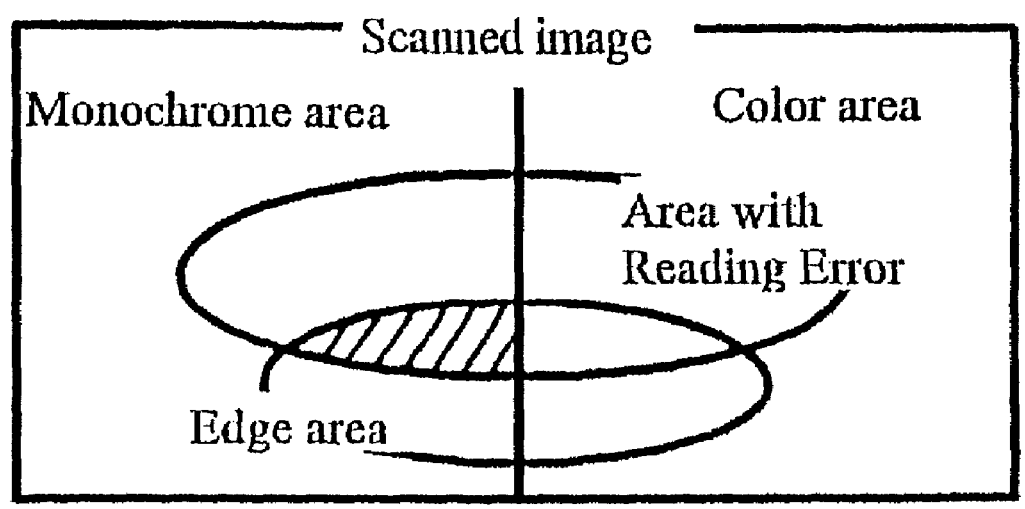
FIG. 6 shows a conceptual division of types of image data included in image data acquired by a color scanner.

FIG. 6 shows an image read into a color scanner divided up depending on properties. The figure is a conceptual diagram showing image data distributed in two dimensions divided up into regions of each property. The figure is an enlarged view divided into color areas and monochrome areas.

Areas with high contrast (edge areas) exist in any of these. Areas with reading errors exist in the same manner but areas with conspicuous color distortion are in the slanted line area of FIG. 6.

In this method, generally, this slanted line area is detected in step (1) separation of color and monochrome, step (2) edge detection and step (3) color distortion determination.

The detection procedure initially separates the color and monochrome. In order to distinguish between color and monochrome, CIE L*a*b* values (CIE standard) close to the degree of human perceived color are used. Conversion calculations of CIE L*a*b* color coordinate systems are as follows.

First, the color coordinate system is converted to an XYZ color coordinate system using formula (2-1).

$$\begin{pmatrix} X \\ Y \\ Z \end{pmatrix} = \begin{pmatrix} 0.49000 & 0.31000 & 0.20000 \\ 0.17697 & 0.81240 & 0.01063 \\ 0.00000 & 0.01000 & 0.99000 \end{pmatrix} \begin{pmatrix} R \\ G \\ B \end{pmatrix} \quad (2\text{-}1)$$

Then, it is converted to a CIE L*a*b* color coordinate system using formula (2-2).

$$\begin{cases} L^* = 166(Y/Y_n)^{1/3} - 16 \\ a^* = 500[(Y/Y_n)^{1/3} - (Y/Y_n)^{1/3}] \\ b^* = 200[(Y/Y_n)^{1/3} - (Y/Z_n)^{1/3}] \end{cases} \quad (2\text{-}2)$$

Now the following result is obtained.

$$\begin{cases} X_n = 95.045 \\ Y_n = 100.00 \\ Z_n = 108.892 \end{cases}$$

Figure 21:
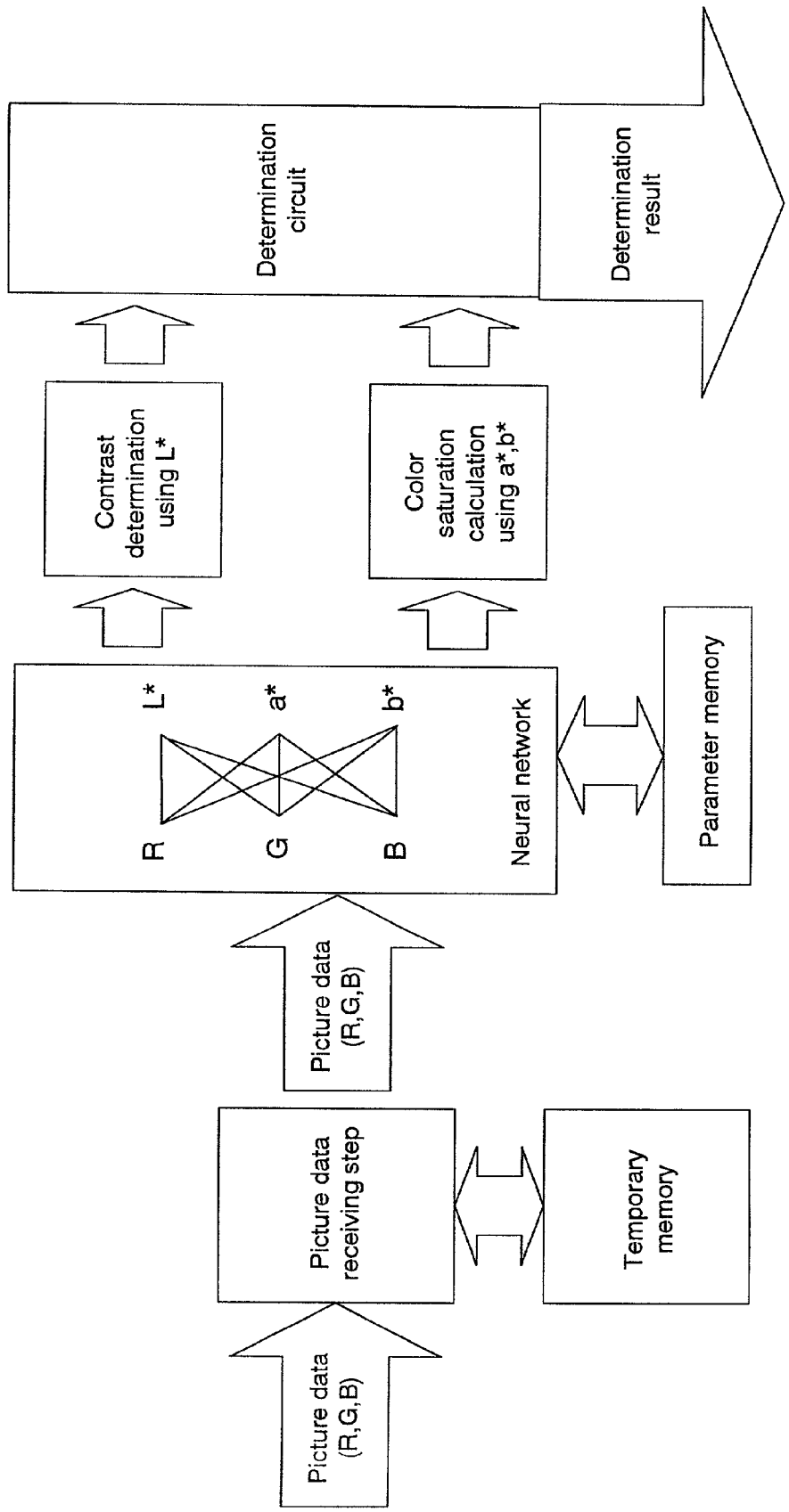
FIG. 21 is a diagram showing a composition of the CIE L*a*b* method used in a neural network.

It is obvious that the processes for the variables above are important, but in reality, these are not real number processes which adhere to the formulas. They can quickly convert from an RGB color space to a CIE L*a*b* color coordinate system in one step by means of a method that uses a neural network to perform approximate conversions or by accumulating conversion relationships as numeric tables. Because of this, real-time comparisons to calculations of correlated values become a simple process. FIG. 21 shows a representative composition when using a neural network. Each section can use conventional circuits.

Figure 7:
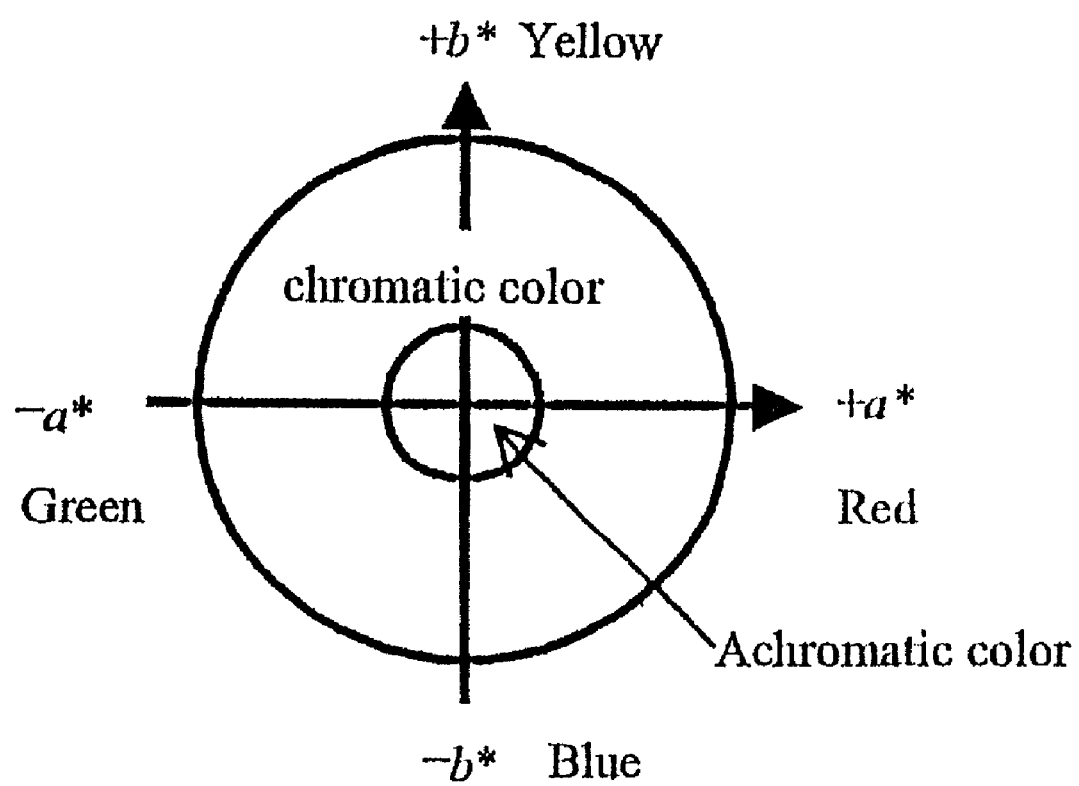
FIG. 7 illustrates a relationship between a degree of perceived color and color using the CIE L*a*b* method.

FIG. 7 is a chromaticity diagram of a CIE L*a*b* color coordinate system. In the figure the a* axis and b* axis intersect at a right angle with the point of intersection forming an achromatic color point (monochrome point). An achromatic color (monochrome) region can be extracted by means of determining the range of the a* value and b* value.

When there is no color distortion, separating the color and monochrome is simple. When there is color distortion, however, separating the color and monochrome areas in pixel units is difficult because the properties of the color and color distortion are similar. Stated in a different way, it is difficult to divide differences of the color and color distortion using only color. Thereupon, the following algorithm separates the color and monochrome.

(1) Separates pixels in regions of m X m.
(2) Creates an accumulation histogram of the a* values and b* values in the vertical direction (sub-scanning direction) in the regions of (1). The accumulation values are normalized by the number of accumulated pixels. This examines the height of the color saturation.
(3) Extracts the accumulation values in (2) which are in the range of values of $Ta_L < a^* < Ta_H$ and also $Tb_L < a^* < Tb_H$ as monochrome regions.
(4) Creates an accumulation histogram of the a* values and b* values in the horizontal direction (primary scanning direction) only for the areas not determined to be monochrome in (3) in order to extract the monochrome regions. The accumulation values are normalized by the number of accumulated pixels here as well.

(5) Extracts the accumulation values in (4) which are in the range of values of $Ta_L<a^*<Ta_H$ and also $Tb_L<a^*<Tb_H$ as monochrome regions.

Since this is stated based on the assumption that the above-mentioned identification process of the achromatic color regions performs the processing after accumulating the surface image data, whether the primary scanning direction or the sub-scanning direction is first is not important. It is preferable, however, for the primary scanning direction to take precedence when performing the process close to real-time in an amount of buffer memory as small as possible.

Monochrome regions are determined by the above-mentioned processes. Next, edges (high contrast border areas) of monochrome regions will be detected.

Figure 8:
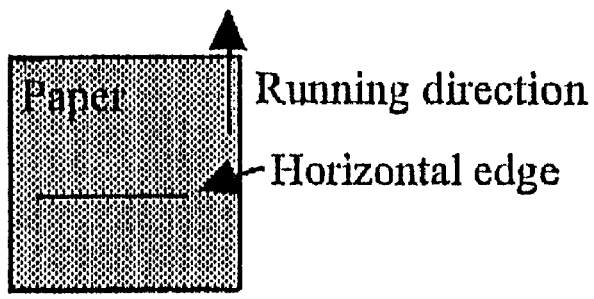
FIG. 8 shows an illustration of an edge where color distortion occurs in a direction of travel of a paper using the CIE L*a*b* method and a Sobel filter.

As shown in FIG. 8, because color distortion occurs in the direction of travel of the paper (sub-scanning direction), the edge in the horizontal direction is detected using a vertical direction Sobel filter. A Sobel filter is a type of differentiation filter.

Now determination of color distortion will be described. In detected edge areas, the pixels in the range of values of $Ta_L<a^*<Ta_H$ and also $Tb_L<a^*<Tb_H$ belong to the achromatic color region at each pixel. Closely examining these regions makes it possible to extract the color distortion.

In the method described here, the image that is used is an image acquired by a sheet pass format and color distortions occur in the travel direction, namely, the conveyance direction, of that paper. Consequently, in order to simplify the observations, detections are limited to the vertical direction. Changing the algorithm to the horizontal direction will also allow use in both directions.

FIG. 9 is a compilation of each threshold value used in the determination. These threshold values are merely samples. The detection sensitivity can be changed by adjusting the threshold values so preparing several threshold values in a table format will naturally make it possible to change the choices depending on the target image such as illustrations, posters, nature images or portraits.

Figure 13:
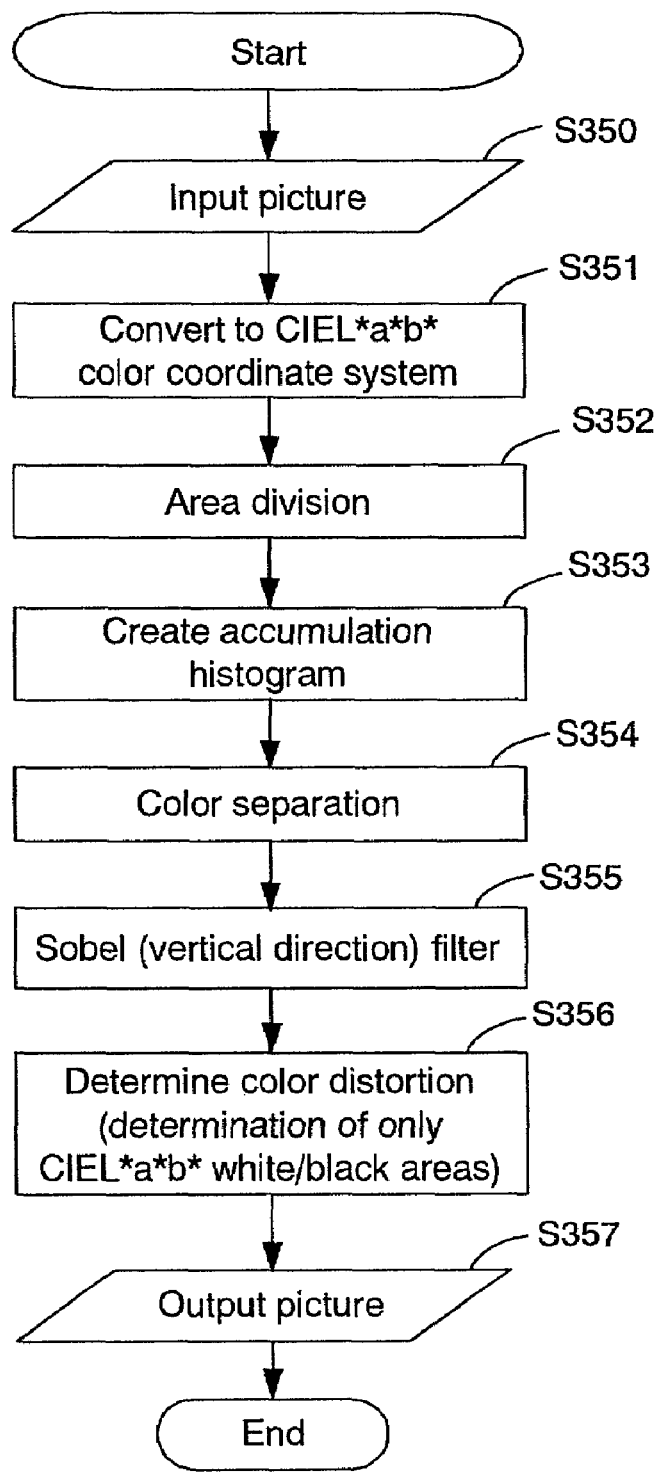
FIG. 13 shows an outline of an overall flow of the CIE L*a*b* method.
Figure 14:
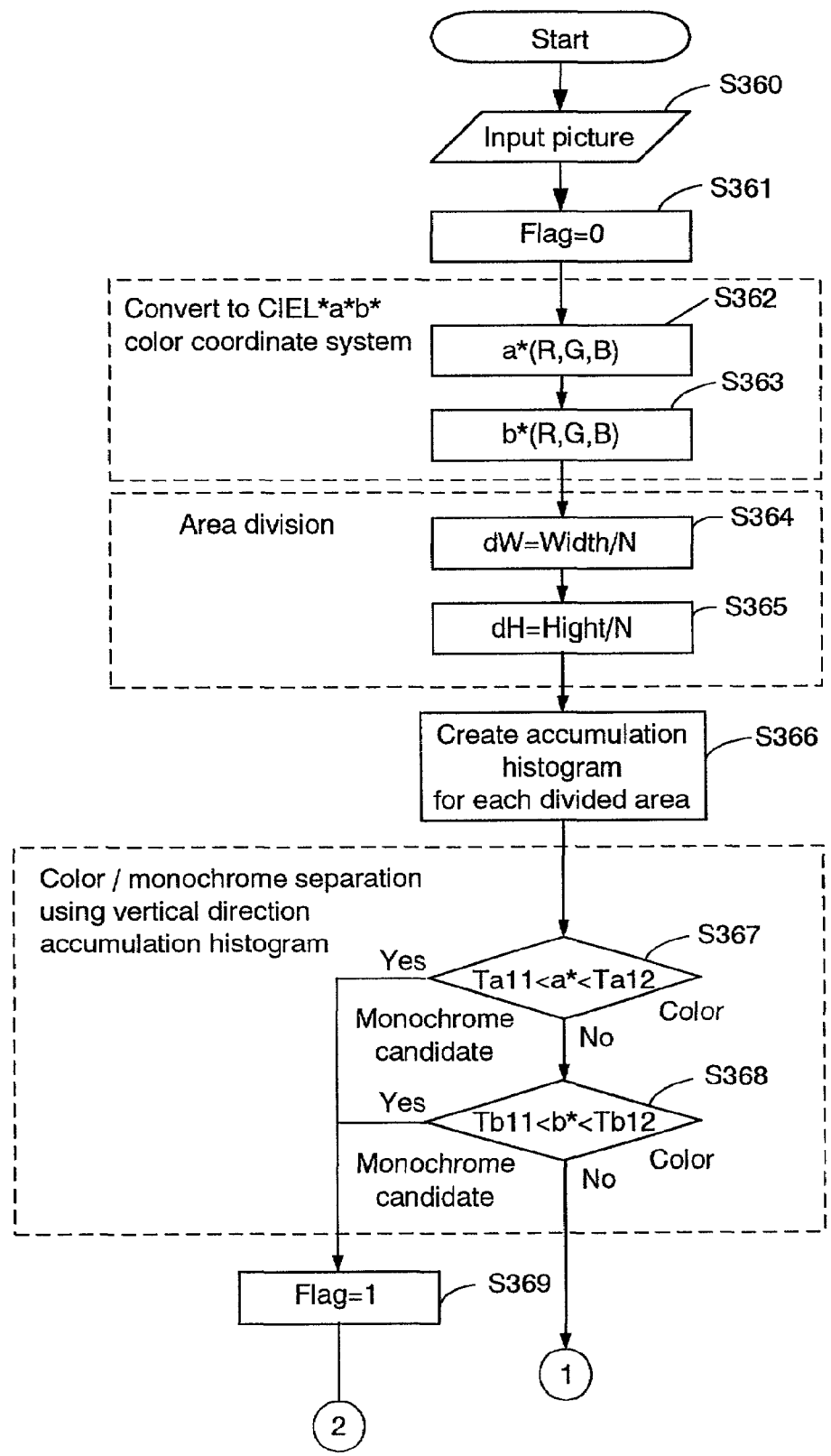
FIG. 14 shows the first half of the flow of the CIE L*a*b* method.
Figure 15:
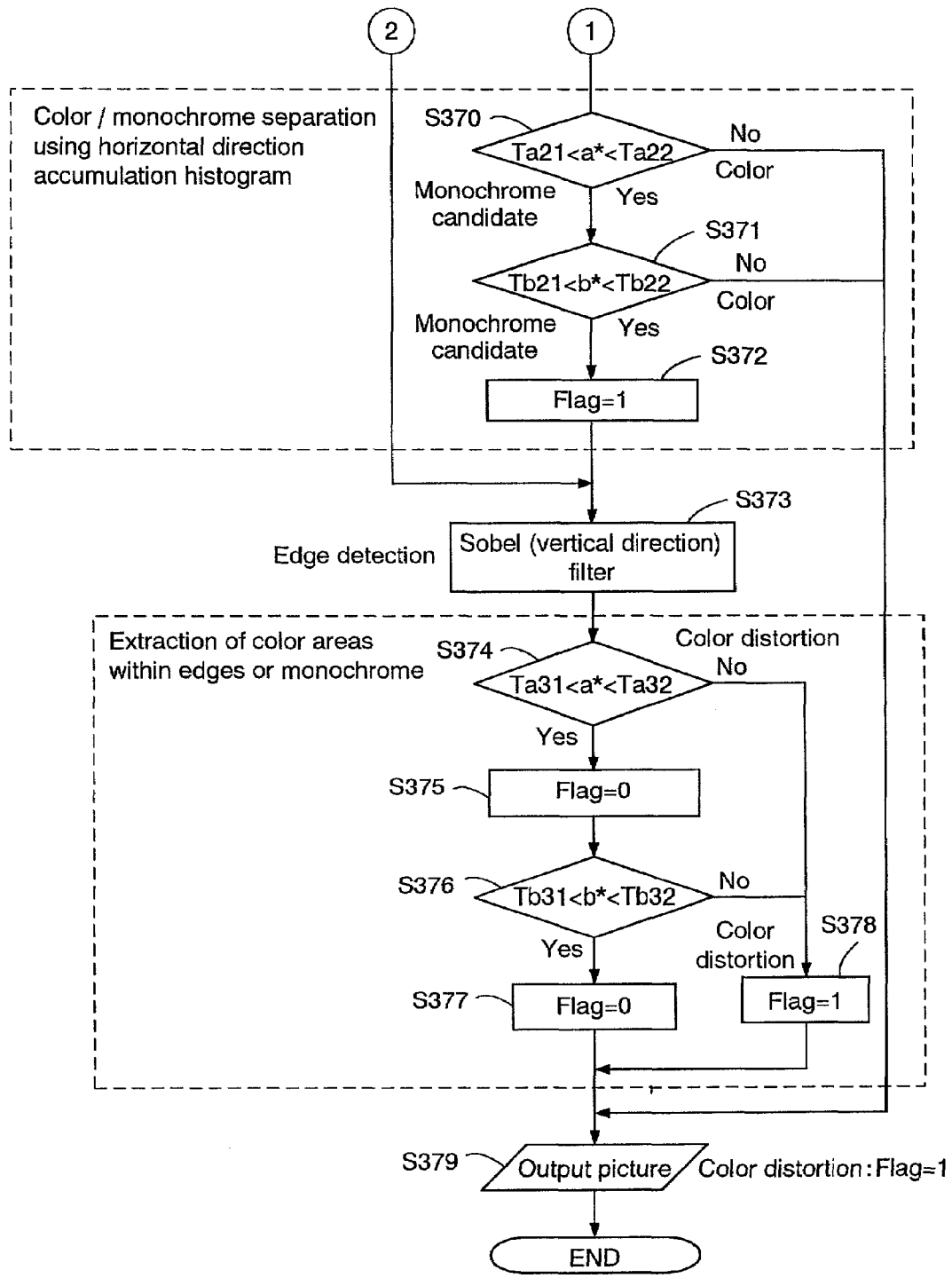
FIG. 15 shows the second half of the flow of the CIE L*a*b* method.

Next, a detailed description will be provided referring to FIGS. 13, 14 and 15. FIG. 13 shows an overall outline, and S305 and S357 are I/O to this process. In S351, a conversion process to a CIE L*a*b* color coordinate system is performed. After this, in S352, the area of the entire original image divides into specified small regions (for example, 50*50). The purpose of this is to create an accumulation histogram of the a* values and an accumulation histogram of the b* values. In S354, the color and monochrome separate using the result of the accumulation histogram. In S355, edge detection within the monochrome region is performed and then the final determination of color distortion is performed in S356.

FIGS. 14 and 15 provide details of the above-mentioned description. S360 and S379 are I/O to this process. In S361, the color distortion position flag is cleared. In S362 and S363, a conversion process to a CIE L*a*b* color coordinate system is performed. In S364 and S365, the area of the entire original image divides into specified small regions. S366 creates a histogram for each small area. Accumulation histograms of the a* values and b* values are prepared. If monochrome is determined in S367 and S368, a flag is raised in S369. In S370 and S371, if monochrome is determined for only the area where the flag was raised, the flag will then be confirmed in S372. In S373, edge (corresponding to determination of contrast) detection within the monochrome region is performed. Then, in S374, S375, S376, S377 and S378, the target pixels (periphery of pixels) will be color within the monochrome area resulting in a determination of color distortion.

Next, the seventh embodiment corresponding to the method in the third determination apparatus will be described. This embodiment makes it possible to detect color distortion even if correlations are calculated within three primary colors.

In a correlation method, the next characteristic is focused on, and color distortion is detected. The target image, however, is limited to monochrome images. Consequently, the color and monochrome are separated in advance using the method already described, and the method described below will become applicable in regions where monochrome is recognized.

If, however, indications, such as a monochrome document, are given beforehand, the method can be applied even if the above-mentioned separation is not performed.

This method is realized on the assumption of the following properties.

(1) Color distortion is noticeable in high contrast areas in an image.
(2) Color distortion has different RGB brightness values.
(3) When color distortion occurs in high contrast areas the brightness values of the distorted colors within RGB are replaced with brightness values of the adjacent pixels. Because of this, there is no consistency with brightness changes of RGB.

Next, the detection process of this method will be described.

The purpose is to detect colors which are noticeably distorting in a correlation coefficient between two colors. Because the color distortion occurs in the direction of travel of the paper (sub-scanning direction), the correlation coefficient is found from formula (3-1) along the direction of travel of the paper, where, $\{x, y\}=\{R, G, B\}$, w is a size of region which has the correlation.

$$Rxy = \frac{\sum_{i=N}^{N+(w-1)} (x_i - \bar{x})(y_i - \bar{y})}{\sqrt{\sum_{i=N}^{N+(w-1)} (x_i - \bar{x})^2} \sqrt{\sum_{i=N}^{N+(w-1)} (y_i - \bar{y})^2}} \quad (3-1)$$

In low contrast areas the value of the denominator of the formula (3-1) decreases and errors increase making it unsuitable to use the values of the correlation coefficient. Therefore, the correlation coefficient is only calculated for areas larger than the threshold value TD (the value of the denominator). When the area is smaller than the threshold value TC (correlation coefficient), it will be detected as color distortion.

Color distortion is detected as follows.

(1) Calculates the value of the denominator of the formula (3-1).
(2) Calculates the correlation coefficient when the denominator is larger than the threshold value TD.
(3) Determines that color distortion exists in those pixels when the correlation coefficient is smaller than the threshold value TC.

Figure 16:
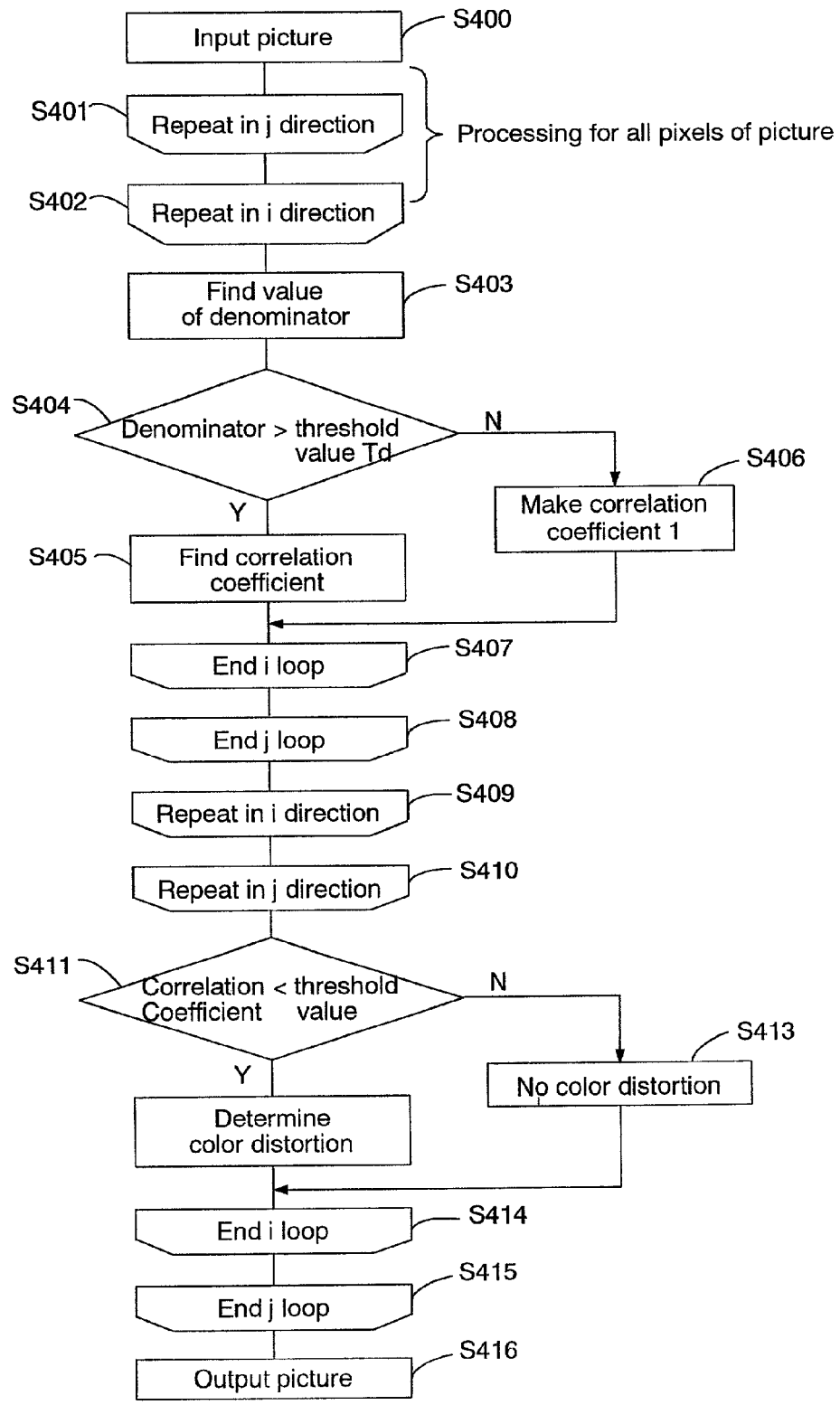
FIG. 16 shows a flow of the correlation method.

Next, a detailed description will be provided referring to FIG. 16. S400 and S416 are I/O to this process. S401, S402, S407 and S408 are loops for repeating calculations of correlated values for all image data. S403 is a denominator calculation in the formula (3-1). This denominator corresponds to standard deviations.

S404 checks whether this standard deviation value is higher than a specified threshold value. When the value is small, the contrast will correspond to low contrast areas thereby becoming a target. In (S406) S405, the numerator of the formula (3-1) is also solved as a next step and then this result divided using the already solved standard deviation. S409, S410, S414 and S415 form a loop to repeat S411, S412 and S413 for all pixels. These three steps determine whether color distortion exists by comparing the correlated value solved above to a specified threshold value.

Now, detection results of each method for original images are shown in FIG. 10. In the figure, the original image A1 has a color region on the right side and is provided with a monochrome line pair on the left side. In this figure, color bleeding (color distortion) exists in the monochrome line pair although this cannot be seen. A2, A3 and A4 are results detected by the correlation method, color saturation method and the CIE L*a*b* method, respectively, and although a few efficiency differences appear, basically the detection can be performed.

FIG. 10 shows results of color distortion detection. The target images are Sample A (300×100 pixels), Sample B (200×200 pixels) and Sample C (600×100 pixels). The white regions in A2, A3 and A4 of FIG. 10 are areas detected as color distortion. The detection threshold values were empirically set as follows.

Width W that has the correlation in the correlation method used in the third and seventh embodiments was three pixels. In addition, the threshold value Td of the denominator was 1000 and the threshold value Td of the correlation was 0.97.

The number of sequential pixels N determined to be color distortion in the color saturation method used in the first and fifth embodiments was four pixels. The threshold value of the color saturation was $T_S = T_{Sr} = 0.173$.

In the color and monochrome separation using the CIE L*a*b* method used in the second and sixth embodiments, the size m of the separation region was 50 pixels, and the threshold value of the edge detection was 400. The accumulation value in the vertical direction, the accumulation value in the horizontal direction and range of the a* value and b* value of the color distortion determination are as shown in FIG. 9.

In the general composition comprising the color scanner 1, computer 2, display 3 and printer 4 shown in FIG. 1, the previously described detection method can be utilized as a program by loading it into internal memory, such as a hard disk, of the computer 2. As a matter of course, even if the detection method program is not loaded initially, it can be copied to CD or FDD and then written to the computer 2. In addition, the program can also be transferred from an electronic path such as the Internet or LAN. If necessary, it can be transferred or held resident in memory. For this case, the computer 2 that has the program installed is an image determination apparatus that functions to detect color distortion. This is the first, second and third embodiments comprised as an image determination apparatus. Furthermore, the algorithms of the program used here implement the methods of the fifth, sixth and seventh embodiments.

Although it is not shown in the detailed figure, the above-mentioned color distortion detection can be performed in the same composition as FIG. 1 using firmware of this color scanner or the program implemented in the hardware. For the composition of FIG. 1 fourth embodiment is an image reading apparatus (color scanner) equipped with a function to detect color distortion as an image determination apparatus.

Figure 2:
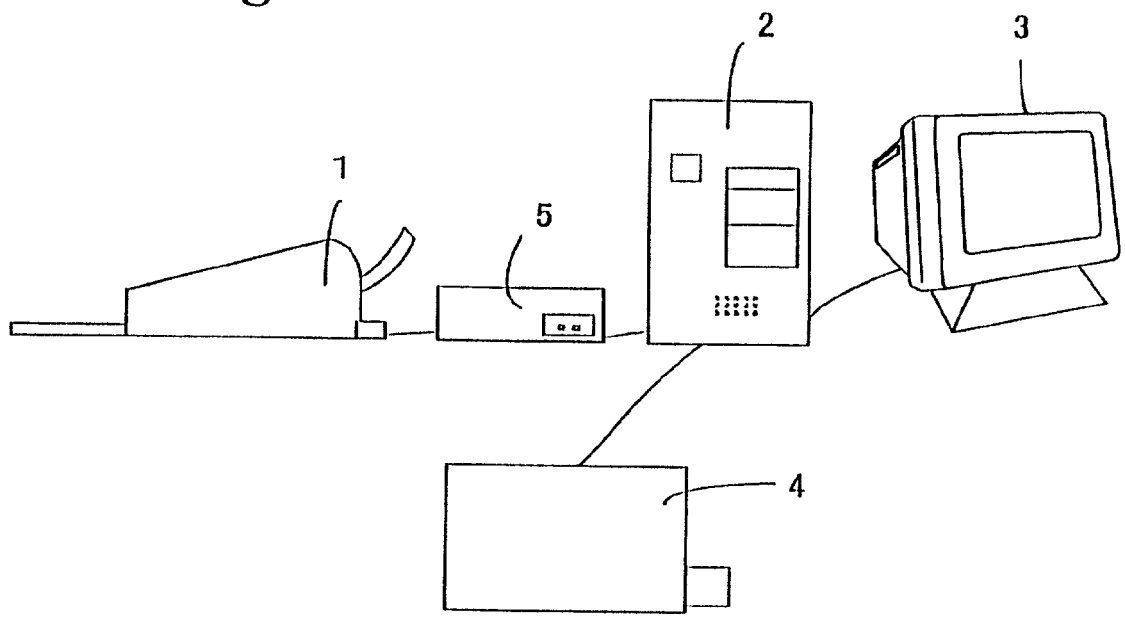
FIG. 2 shows color distortion detection independently comprised as an image determination apparatus.

As shown in FIG. 2, this color distortion detection function can be made independent and interfaced as a unit. This can be an image determination apparatus that detects color distortion.

A description of designing a unit as described above is simplified referring to FIG. 20. As an easy way to design a unit, a single chip microcomputer is used with the methods of the already described fifth, sixth and seventh embodiments loaded into a program and then written to a program ROM. As previously described, a page memory for at least three primary colors is necessary. Color saturation, histograms, and correlated values must be held in this memory. Because of this, installing a sufficient amount of work memory is also necessary.

Next, as an image reading apparatus of the fourth embodiment the color scanner 50 equipped with a color distortion detection means and the ADF 90 that includes a reading function will be described referring to FIG. 17 and FIG. 18. For convenience sake, there are instances where the reading direction of the image sensor will be described as the primary scanning direction. However, depending on a design of the optical system as previously described, the photoelectric transducer scanning direction of the image sensor will be a direction different from the direction of the lines which read the document. Consequently, the direction of the document reading lines is defined as the primary scanning direction and the sub-scanning direction (direction of movement relative to the document and reading lines) intersects the primary scanning direction at a right angle.

This will be described referring to FIG. 17, FIG. 18 and FIG. 19. Documents, whose top surface will be read and loaded onto the paper feed tray 67, are grabbed by the pickup roller 52, and then the document feed roller 53 passes the document under the adhesion image sensor 60 (hereinafter referred to as CIS 60) from the reading front roller 54. After passing under the CIS 60, the document passes under the back platen 65. Then, the document is sent onto the discharge tray 66 by the discharge roller 55. At this time, the optical carriage 57 that moves on the rails of the color scanner 50 moves the reading position under the back platen 65 setting up a state that allows reads.

The optical carriage 56 is equipped with an image sensor 57 (that has a three line CCD), a lens 58, a mirror 59, and a light source 69. Further, the CIS 60 is comprised of a light source (not shown in the figure), a SELFOC lens group 62, three equal sensor lines equipped with a color sensor, and a substrate 61 equipped with three primary color portions.

The three primary color image data produced from the CIS 60 is sent to the image processing substrate for ADF 70. A color distortion detection means (described later) is loaded in the image processing substrate for ADF 70. In the same manner, the three primary color image data is sent to the image processing substrate for color scanner 80. A color distortion detection means (described later) is also loaded in the image processing substrate for color scanner 80. In the figure, 82 is a SCSI connector used to interface to a computer.

Next, the circuit composition will be described referring to FIG. 18. To start, image data for each color is input to the image processing substrate for ADF 70 from the CIS 60. The data digitized for each color by the A/D converter 110 is input to the shading correction means 111 wherein shading correction is performed for each color. The data from the shading correction means 111 is input to the line interval correction means 112 wherein each eight line segment is superimposed while using a work memory (not shown in the figure). Then, the data, whose reading position is corrected, is stored in the page memory 113.

Hereupon, an outline based on the block diagram of FIG. 18 will be described. The three primary color image data stored in the page memory 113 is managed by the CPU 119, and the address control unit 115 examines the values of every pixel starting from the first line of the read until the last line of the read, and the color distortion is detected by the color distortion unit 118. This color distortion detection unit 118 is implemented in hardware, thereby making it possible to execute the color distortion detection method of the already described fifth, sixth and seventh embodiments.

Figure 20:
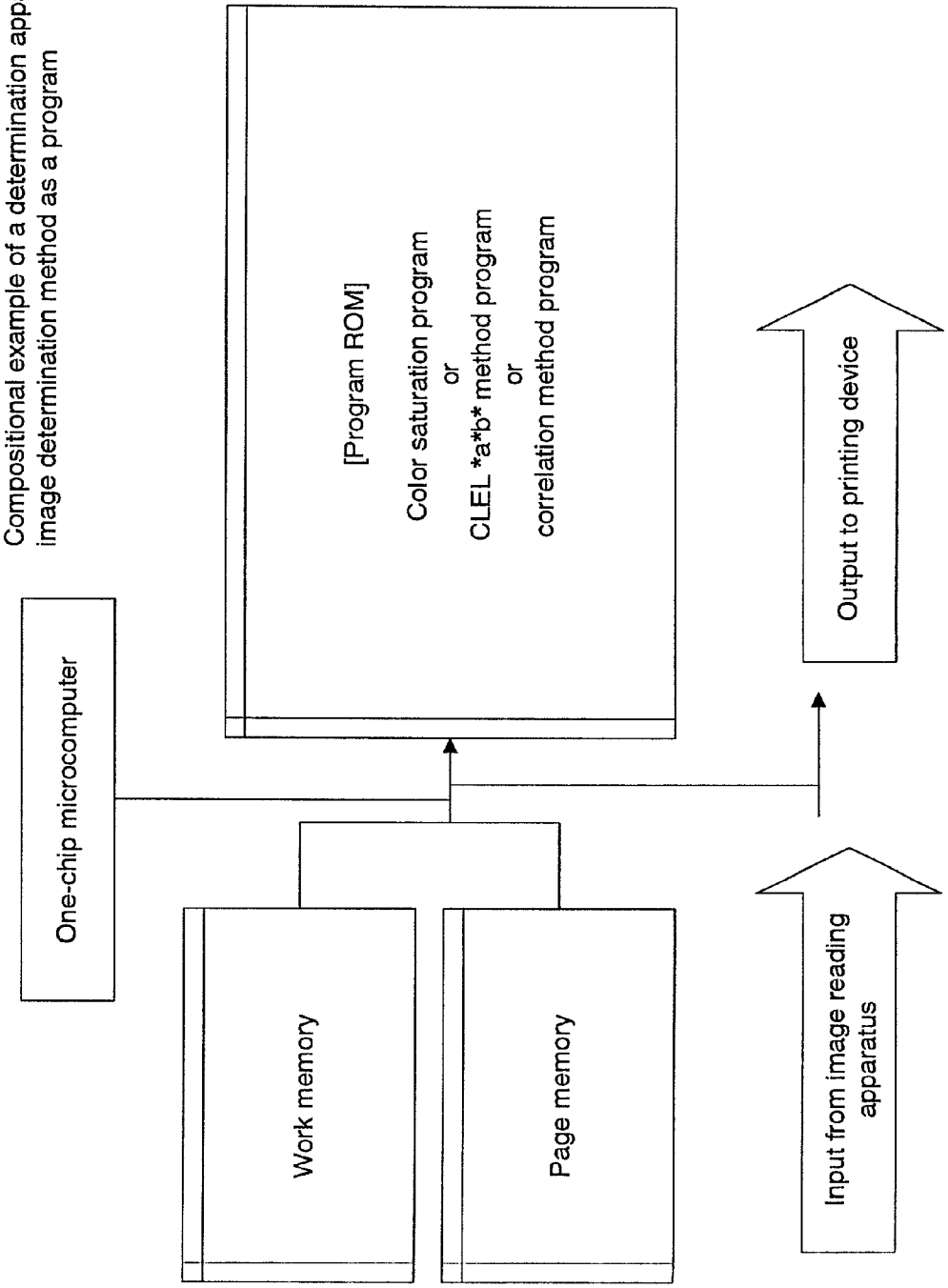
FIG. 20 shows a block diagram of an image determination apparatus.

Basically, implementing the calculation functions of each process in hardware simplifies the work of the operators. In addition, implementing the functions in hardware can be done by installing a special one-chip microcomputer and loading a program as an eighth embodiment in memory, such as program ROM, even without actually implementing it in hardware. FIG. 20 is a block diagram that shows an outline of this.

The CPU 119 determines whether each pixel is examined and whether there is a location where color distortion occurred using the result in the color distortion detection unit 118. A flag is then entered in the work memory located inside the memory shift control unit 117.

It displays 1 when color distortion is present at the location, and displays 0 if it does not exist. This operation is a repetitive process for all lines of three colors, or in other words, three colors for each page. Consequently, the flags corresponding to all pixels are determined as 1 or 0. Naturally, the result of the contrast calculation unit 114 which is located in the work memory of the color distortion detection unit 118 can be written to the memory in the memory shift control unit 117, or it is also perfectly acceptable to install a special memory for the same result. Using either of these memories is the same and is only a simple design change.

The memory shift control unit 117 calculates the amount of distortion referring to the flags. The density value (pixel value) in each pixel utilized in this calculation is executed while reading and writing from the (previously described) work memory or page memory where the data is temporarily stored. This control, however, is jointly managed by the CPU 119 and the address control unit 115.

Data which has undergone color distortion correction using this type of algorithm subsequently passes through the I/F control unit 120 of the image processing substrate for ADF 70 and is transferred to the image processing substrate for color scanner 80. The data is sent to a computer connected as a host device from the connector 82 passing through a bus buffer skipped on the image processing substrate for color scanner 80 on the receiving side and also passing through the SPC 139 (SCSI interface controller). The sequence, such as process or color, sent to the computer at this time is dependent on the software operating on the computer. Therefore, there is a buffer memory 141 that temporarily buffers the data in order to allow it to be replaced or another similar action taken. This secession of processes is correctly held in synchronous order by the clock control unit 116.

The processes in the image processing substrate for color scanner 80 are basically the same as those in the image processing substrate for ADF 70, so details of them will be omitted. However, image signals from the image sensor 57 (three line color CCD) are digitized by the A/D converter 130 and undergone shading correction by the shading correction unit 131. The outputs of this are made consistent by the line interval correction means 132 and then temporarily stored in the page memory 133.

Because the data are utilized by the color distortion detection unit 138 and the contrast calculation unit 134, color distortion is determined jointly by the CPU 139 and the address controller 135, and the color is matched by memory shift control means 137. This secession of processes is made synchronous and the processing advanced by the clock control unit 136.

Image data that underwent final color matching is stored together with image data received from the image processing substrate for ADF 70 in the buffer memory 142. While the transfer is being controlled by the CPU 139, the data are controlled by the SPC 140 and sent from the connector 82 in synchronization with the application on the computer side in the same manner as the image data received from the image processing substrate for ADF 70.

Figure 18:
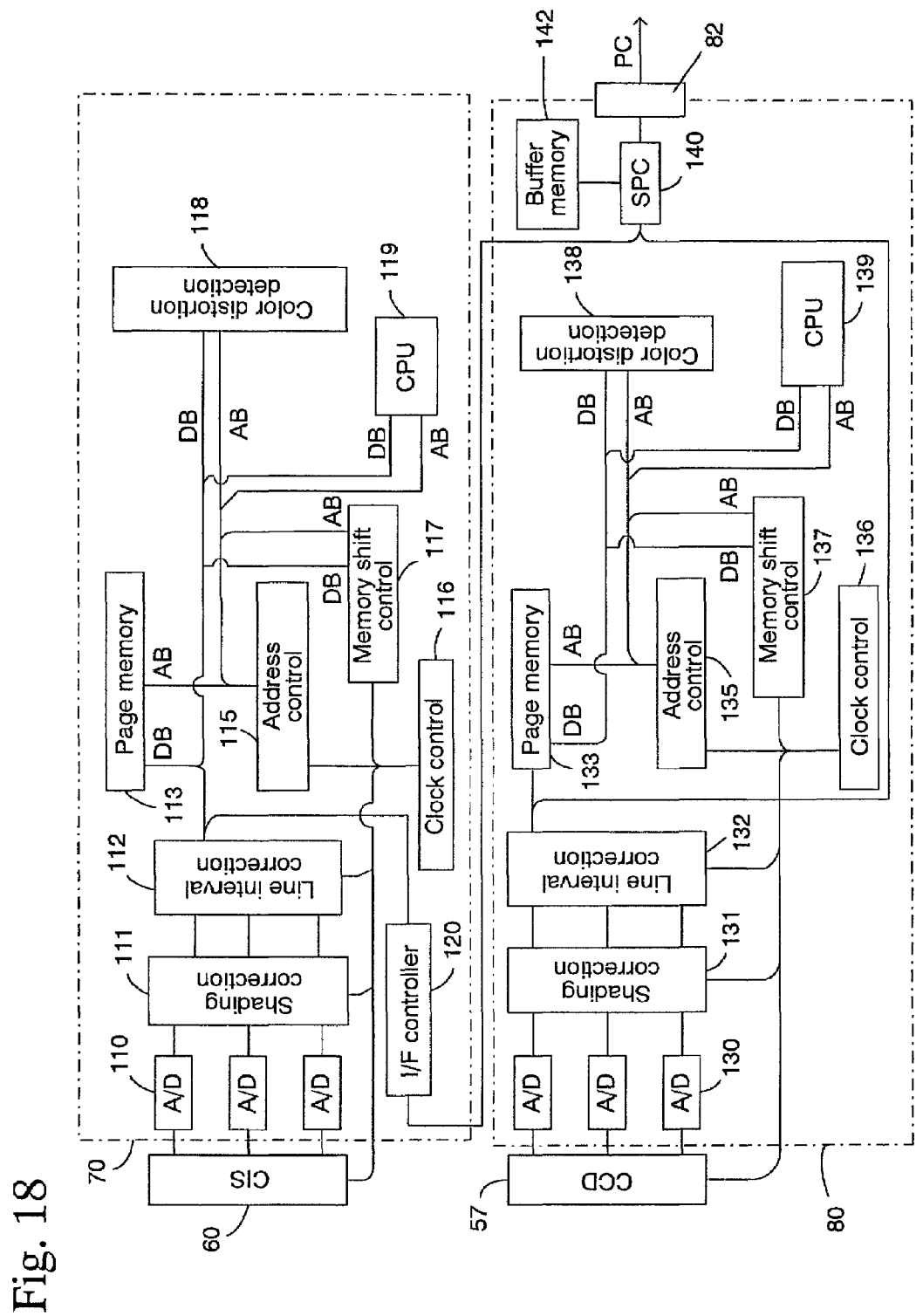
FIG. 18 shows a block diagram of a color scanner that includes an ADF.
Figure 19:
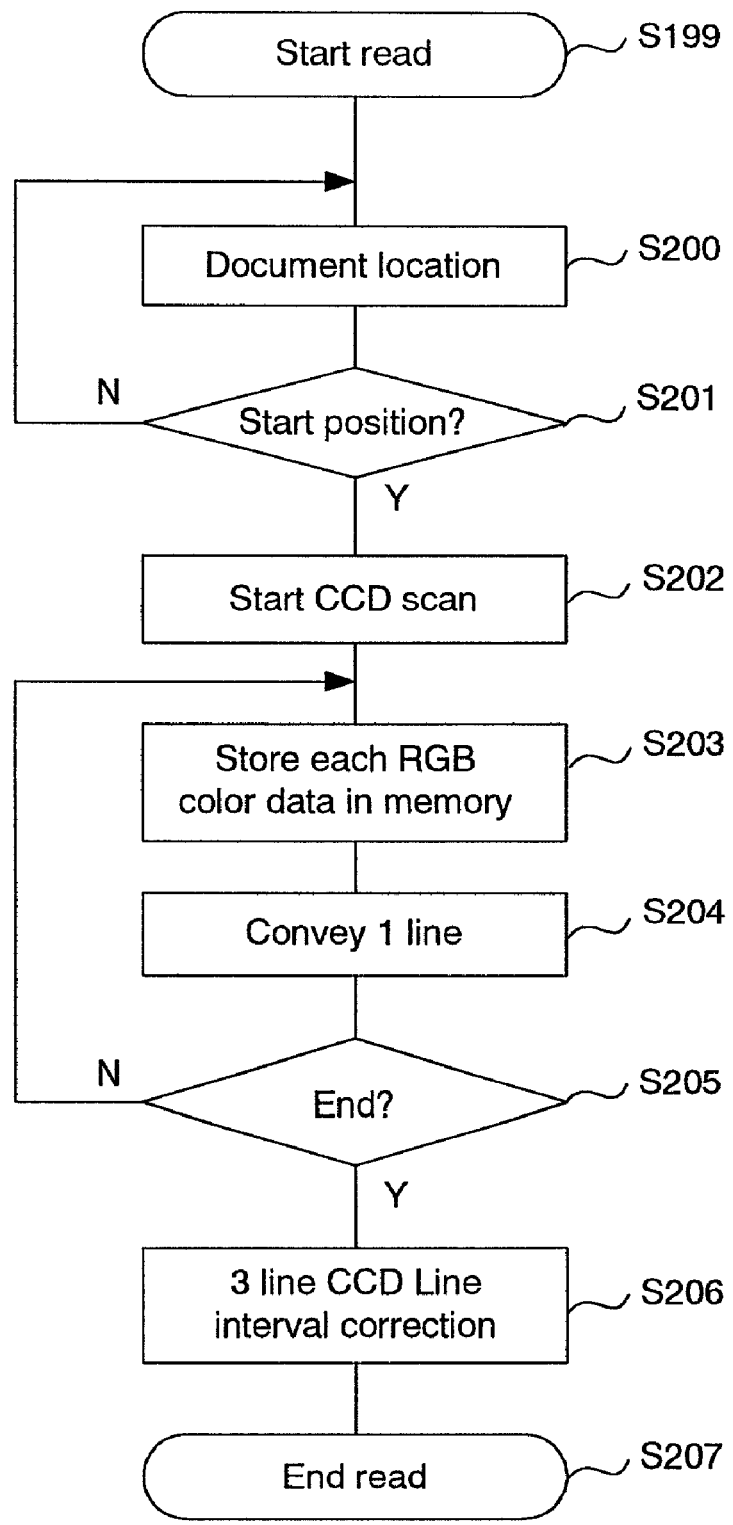
FIG. 19 shows an outline of a flow of a color scanner that includes an ADF.

The following description is made referring to FIG. 17, FIG. 18 and FIG. 19. A document stack is loaded onto the paper feed tray 14. When the conveyance starts, initially the document on the uppermost surface is picked up by the pickup roller 16. The picked up document is sent to the front read roller 18 by the supply roller 17.

The document that is further sent by the front read roller 18 between the back platen 25 and the read window 13 is then sent to the discharge roller. The document is then discharged to the discharge tray 15 by the discharge roller 19. The surface of the back platen 25 is white. Consequently, the image data read by the sensor of the carriage 12 appears white when there is no document or there are excessively read regions such as the periphery of a document.

In contrast, the optical carriage 12 that can move on a rail is located inside the flatbed color scanner 10. A three line color CCD 22 (Hereinafter referred to as image sensor 22. This image sensor need not be a CCD. It can be a MOS or other type as well.), a lens 21, a mirror 20, and a light source 24 are installed in the optical carriage 12.

When the document surface is lowered onto the glass copy stand 26 and the loaded fixed document is read, the document surface is read while the carriage 12 moves in the SW direction. When the entire document is read, the optical carriage 12 returns in the BK direction and is then positioned, and stops based on a home position sensor (not shown in the figure).

In contrast, when reading a document sent to the above-mentioned ADF 11, the optical carriage 12 moves to the lower surface of the read window 13 and then waits at the read position lined up with the read window 13. Thereafter, when a signal is received by the position sensor located close to the front read roller (not shown in the figure), the image processing as well as the read processing circuit starts the reading. In the example shown in FIG. 2, a drive means, such as a pulse motor, is located in the ADF 11 and controls the conveyance synchronous with the operation of the flatbed color scanner 10.

The detailed operation was already described, and an outline of the operation flow is shown in FIG. 19. S119 is a start block, for example, a read command from a personal computer. The ADF uses the location sensor of S200 to repeat document location detection until reaching the read start position of S201.

Upon reaching the read start position, the CCD scanner of S202 operates and reads the document. The data is then stored in page memory. After completing S203~S205, the position of the three lines of the CCD will be structurally different. Then, positioning using prime numbers only is performed in S205, and the process completes in S207 moving to the color distortion detection already described.

FIG. 1 shows an example of this correction process internally provided in a color scanner. As shown in, FIG. 2, however, the apparatus 5 that has this image determination process that functions as color distortion detection can be formed and installed in the latter part of a color scanner. Of course, this color distortion detection function does not need to be located in any certain location. For example, it can be located between the printer 4 and the computer 2 or within the printer 4.

Storing this correction process as a program on a recording medium such as a CD-ROM and then distributing it, supplying it as a single program via a network such as the Internet and downloading as necessary, or providing a program upgrade service is all common sense in this day and age.

What is claimed is:

1. An image determination apparatus for a sheet, comprising:
   a color distortion detection unit in the sheet, said color distortion detection unit having means for selecting a small area with high contrast among monochrome areas of image data consisting of three color components R, G, B, means for calculating correlation coefficients between R and G image data, between G and B image data, and between B and R image data in said small area, and means for comparing the respective correlation coefficients with a threshold value, and
   determination means for determining if there is a color distortion based on comparisons in the color distortion detection unit,
   wherein in said means for selecting the small area with high contrast, product of standard deviations of the R and G image data, product of standard deviations of the G and B image data, and product of standard deviations of the B and R are obtained in respective small areas in the monochrome areas, and comparisons are made by comparing the respective products with the threshold value to thereby select the small area with the high contrast.

2. An image determination method for a sheet, comprising the steps of:
   a step of selecting a small area with high contrast among monochrome areas of image data consisting of three color components R, C, B,
   a step of calculating correlation coefficients between R and G image data, between G and B image data, and between B and R image data in small areas, and
   a step of determining if there is a color distortion based on comparison of the respective correlation coefficients with a threshold value,
   wherein the step of selecting the small area with high contrast includes a step of obtaining product of standard deviations of the R and G image data, product of standard deviations of the G and B image data, and product of standard deviations of the B and R image data in each small area in the monochrome areas, and a step of selecting the small area with the high contrast based on comparisons of the respective products with the threshold value.

* * * * *